US012794345B2

(12) United States Patent
Rader, III et al.

(10) Patent No.: US 12,794,345 B2
(45) Date of Patent: Nov. 10, 2026

(54) AC-DC POWER CONVERTER WITH MULTI-PORT DC OUTPUT CIRCUIT

(71) Applicant: Silanna Asia Pte Ltd, Singapore (SG)

(72) Inventors: William E. Rader, III, Carrboro, NC (US); Aleksandar Radic, British Columbia (CA)

(73) Assignee: Silanna Asia Pte Ltd, Singapore (SG)

(*) Notice: Subject to any disclaimer, the term of this patent is extended or adjusted under 35 U.S.C. 154(b) by 205 days.

(21) Appl. No.: 18/651,346

(22) Filed: Apr. 30, 2024

(65) Prior Publication Data

US 2024/0372458 A1 Nov. 7, 2024

Related U.S. Application Data

(60) Provisional application No. 63/499,540, filed on May 2, 2023.

(51) Int. Cl.
*H02M 1/00* (2006.01)
*H02J 1/08* (2006.01)

(52) U.S. Cl.
CPC ............. *H02M 1/009* (2021.05); *H02J 1/084* (2020.01)

(58) Field of Classification Search
CPC ................................ H02M 1/009; H02J 1/084
See application file for complete search history.

(56) References Cited

U.S. PATENT DOCUMENTS 10,291,126 B1 5/2019 Wei et al.
11,581,797 B2 * 2/2023 Chang ................... H02M 3/335
2002/0181259 A1 12/2002 Duerbaum et al.
2003/0086280 A1 5/2003 Bourdillon
2016/0380455 A1 * 12/2016 Greening ................ H02M 1/10 320/114
2021/0058005 A1 * 2/2021 Shah ................. H02M 3/33576
2021/0091675 A1 3/2021 Rajesh et al.
2021/0223838 A1 * 7/2021 Yeh ......................... G06F 1/266

FOREIGN PATENT DOCUMENTS

JP 2002238249 A 8/2002
KR 1020040068132 A 7/2004
WO 2015072645 A1 5/2015
WO 2016050645 A1 4/2016

OTHER PUBLICATIONS

International Search Report and Written Opinion dated Jul. 29, 2024 for PCT Patent Application No. PCT/IB2024/054203.

* cited by examiner

*Primary Examiner* — Harry R Behm
(74) *Attorney, Agent, or Firm* — MLO, a professional corp.

(57) ABSTRACT

A power converter includes an AC/DC converter to generate a DC output voltage based on an AC input voltage. A multi-port DC output circuit receives the DC output voltage and provides respective DC output voltages to a first DC output port and a second DC output port. The multi-port DC output circuit includes a first intermediate rail voltage switch, a second intermediate rail voltage switch, and multiple bus switches, a body diode of the first intermediate rail voltage switch being forward biased with respect to the first secondary side output voltage, and a body diode of the second intermediate rail voltage switch being reverse biased with respect to the first secondary side output voltage. The bus switches control a routing of a first intermediate rail voltage and a second intermediate rail voltage of the multi-port DC output circuit to the first DC output port and the second DC output port.

18 Claims, 14 Drawing Sheets

230

430

530

630

930

1030

1400

AC-DC POWER CONVERTER WITH MULTI-PORT DC OUTPUT CIRCUIT

RELATED APPLICATIONS

This application claims priority to U.S. Provisional Patent Application No. 63/499,540, filed May 2, 2023, all of which is incorporated herein by reference in its entirety.

BACKGROUND

The USB industry standard has been widely adopted for charging and powering mobile devices, such as cell phones, laptop computers, tablet computers, and similar. These devices often have different power requirements and adhere to various USB versions and connector types, such as USB Type-A, USB Type-B, and USB Type-C.

Most mobile devices are provided by their respective manufacturer with a dedicated charger. However, consumers may wish to have a multi-port charger that can supply a DC power output to more than one device at a time. For example, some consumers may desire a multi-port charger that is operable to charge their cell phone and wireless headphones simultaneously. As such, the demand for power supply solutions that are compact, efficient, and versatile has significantly increased.

Conventional solutions for providing power to multiple USB devices simultaneously have had several limitations, including restrictions on maximum voltages, inefficient power conversion, and large form factors.

SUMMARY

In some aspects, the techniques described herein relate to a power converter including, an AC/DC converter configured to generate a first secondary side output voltage based on an AC input voltage, the first secondary side output voltage being a first DC voltage; and a multi-port DC output circuit configured to receive the first secondary side output voltage from a first output node of the AC/DC converter and to provide respective DC output voltages to a first DC output port and a second DC output port, the multi-port DC output circuit including a first intermediate rail voltage switch, a second intermediate rail voltage switch, and a plurality of bus switches, a body diode of the first intermediate rail voltage switch being forward biased with respect to the first secondary side output voltage, and a body diode of the second intermediate rail voltage switch being reverse biased with respect to the first secondary side output voltage; wherein: the plurality of bus switches are configured to control a routing of a first intermediate rail voltage and a second intermediate rail voltage of the multi-port DC output circuit to the first DC output port and the second DC output port in response to a plurality of gate control signals.

DETAILED DESCRIPTION

Conventional solutions for providing power to multiple USB devices simultaneously have had several limitations, including restrictions on maximum voltages, inefficient power conversion, and large form factors. This is because conventional power converters often utilize at least one inductor per DC output, which can lead to increased complexity, power dissipation, cost, and size. Furthermore, these conventional solutions typically do not account for the dynamic power requirements of different USB devices, leading to inefficient power management and potential damage to the connected devices.

To elaborate, AC/DC converters with multiple DC outputs conventionally have a separate DC/DC converter dedicated to each output. In some conventional solutions, each DC/DC converter includes a respective inductor or transformer winding, each of which adds to the material cost and design complexity of the AC/DC converter. Disclosed herein are AC/DC converters that distribute power from a single transformer to multiple voltage output ports without requiring separate inductors for each voltage output, thereby advantageously reducing the cost and size of the AC/DC converters as compared to conventional solutions. Additionally, several of the AC/DC converters disclosed herein advantageously reduce the number of high-power dissipation switches (i.e., switches with a high RDS(on) resistance) in the respective output power path as compared to conventional solutions.

As disclosed herein, reducing the number of switches that receive a high peak current is achieved, in part, by configuring the multi-port DC converters such that at least one DC output port is of a higher voltage than that of one or more other DC output ports. By reducing the number of switches in the high peak current path while still maintaining the ability for the DC output ports to each provide a wide range of voltages, lower power dissipation is achieved with relatively low-cost switches.

Additionally, by not requiring a separate DC/DC power converter to be used for each DC output port, the cost and size of the solution can be reduced. As disclosed herein, rather than using a separate DC/DC power converter for each DC output port, output power from a single AC/DC power converter is routed to multiple DC output ports. The peak current across each of the switches used for routing the output power from the AC/DC converter may be significantly higher than an average current, which conventionally results in a high power dissipation due to a high RDS(on) of the switches. However, several of the multi-port DC output circuits disclosed herein advantageously limit the peak current to just a small number of low RDS(on) switches, thereby reducing design cost and size as compared to conventional solutions which may require a greater number of low RDS(on) switches to limit power dissipation.

Figure 1:
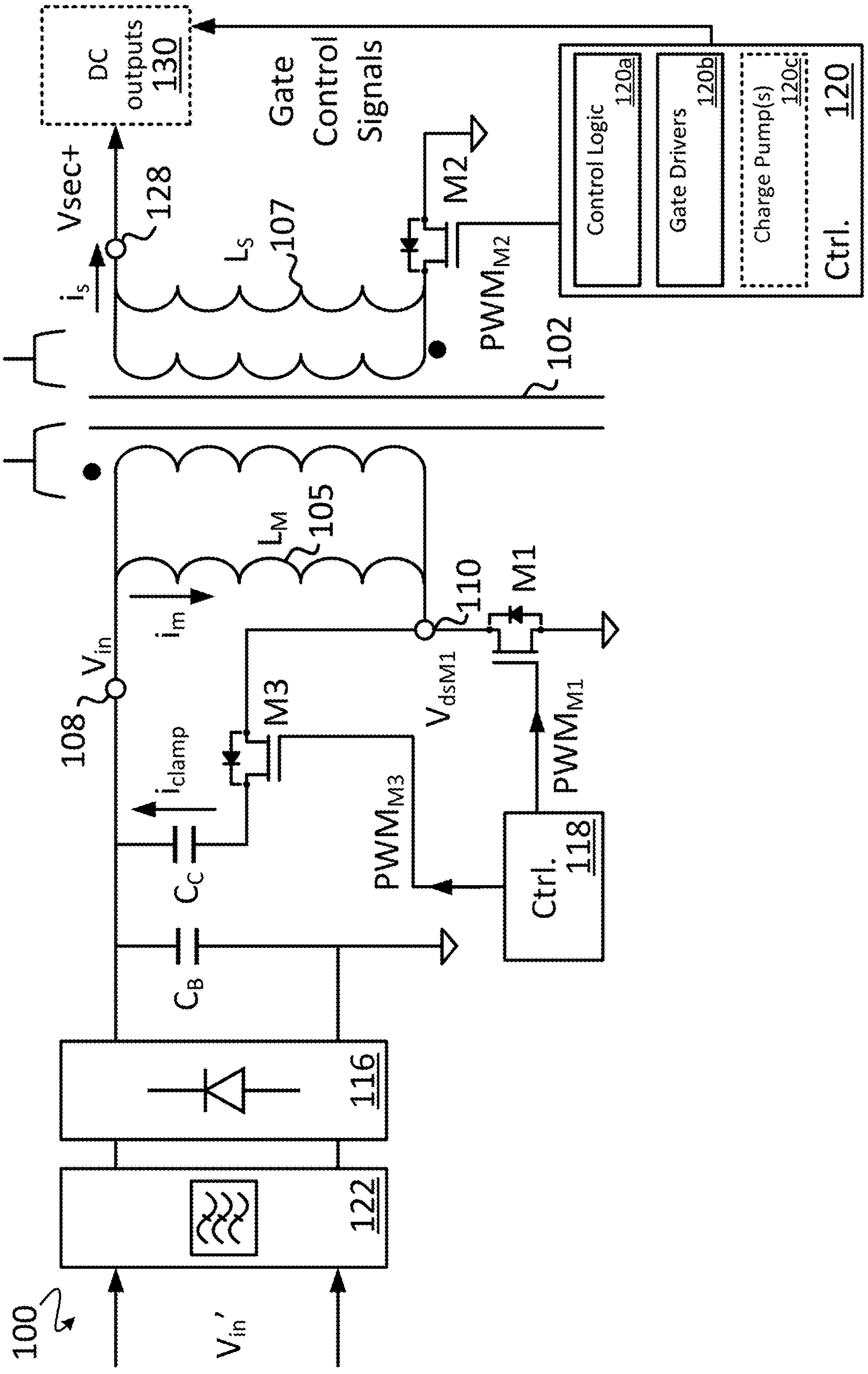
FIG. 1 is a simplified schematic of a power converter having a secondary side multi-port DC output circuit, in accordance with some embodiments.

Attention is initially drawn to FIG. 1 which shows a simplified circuit schematic of a flyback power converter ("power converter") 100 with a multi-port DC output circuit, in accordance with some embodiments. Some elements of the power converter 100 have been omitted from FIG. 1 to simplify the description of the power converter 100, but are understood to be present.

A voltage source $V_{in}'$ is received at the power converter 100. The voltage source $V_{in}'$ can be provided either as an alternating current (AC) or direct current (DC). An input side of the power converter 100 generally includes an input voltage filter block 122, a rectifier block 116 (in the case of AC input), an input voltage buffer capacitor $C_B$, an active clamp circuit that includes an active clamp capacitor $C_C$ and an active clamp switch M3 driven by a pulse-width-modulation (PWM) control signal $PWM_{M3}$, a main switch M1 driven by a PWM control signal $PWM_{M1}$, and a primary side controller circuit 118. The input voltage filter block 122, the rectifier block 116, and the input buffer capacitor $C_B$ provide a filtered, buffered, rectified, or otherwise conditioned input voltage $V_{in}$ (i.e., a DC input voltage at a DC voltage input node) to a transformer 102.

The transformer 102 transfers power from the primary side of the power converter 100 to a secondary side of the power converter 100 and generally includes a primary winding 104 with a first terminal 108 and a second terminal 110. Also shown is an output node 128 of a secondary winding of the transformer 102.

The output side of the power converter 100 generally includes a secondary winding 106 of the transformer 102, a synchronous rectifier switch M2, a secondary side controller circuit 120, and is configurable to provide power to a multi-port DC output circuit 130, as disclosed herein. Alternative example embodiments of the multi-port DC output circuit 130 are described with reference to FIG. 2 and FIGS. 4-13. The multi-port DC output circuit 130 is operable to provide a regulated DC output voltage to one or more loads. Examples of such loads are devices that adhere to various USB standards, such as USB Type-A and/or USB Type-C devices, among others.

As described in greater detail below, the secondary side controller circuit 120 includes a control logic circuit 120*a*, gate driver circuits 120*b*, and optional charge-pump circuits 120*c*. In some embodiments, the charge-pump circuits 120*c* are operable to receive a DC input voltage (e.g., Vin, or a voltage generated using an auxiliary winding of the transformer 102 (not shown)) and to generate a configurable gate drive voltage that is subsequently used by the gate driver circuits 120*b* to generate all or a portion of the plurality of gate control voltages. The secondary side controller circuit 120 is operable to provide a synchronous rectifier switch control signal $PWM_{M2}$, via the gate driver circuits 120*b*, to a synchronous rectifier switch M2, as well as to provide gate control signals to the switches associated with the multi-port DC output circuit 130, as described below.

The first terminal 108 of the primary winding 104 receives the DC input voltage $V_{in}$. The second terminal 110 of the primary winding 104 is coupled to a drain node of the main switch M1 and the active clamp switch M3. The main switch M1 controls a magnetizing current $i_m$ through the primary winding 104 to charge a magnetizing inductance $L_M$ 105 of the transformer 102 during a first portion of a switching cycle of the power converter 100. The synchronous rectifier switch M2 controls a secondary side current flow $i_s$ through the secondary winding 106 to discharge a secondary side inductance $L_S$ 107 of the transformer 102 into the multi-port DC output circuit 130 during a subsequent portion of the switching cycle.

When the main switch M1 is enabled by the primary side controller circuit 118 during a first portion of a switching cycle of the power converter 100, current flows through the primary winding 104 to a voltage bias node such as ground. The current flow $i_m$ through the primary winding 104 causes energy to be stored in the magnetizing inductance $L_M$ 105 and a leakage inductance $L_L$ (not shown) of the transformer 102. When the main switch M1 is disabled in a subsequent portion of the switching cycle, a secondary side output voltage Vsec+ and the secondary side current $i_s$ are provided to the multi-port DC output circuit 130. When the main switch M1 is turned off, a reflected voltage ($nV_{out}$, not shown) is developed at the primary winding 104. The contribution of the reflected voltage $nV_{out}$ to a drain-source voltage $V_{dsM1}$ of the main switch M1 at the second terminal 110 is expressed as:

$$V_{dsM1} = V_{in} + nV_{out} \qquad \text{(Equation 1)}$$

where n is a turns ratio of the transformer 102. Energy stored in the leakage inductance $L_L$ of the transformer 102 also contributes to the voltage $V_{dsM1}$ developed at the second terminal 110 and charges the active clamp capacitor $C_C$ via a resonant clamp current $i_{clamp}$. The active clamp circuit prevents the voltage $V_{dsM1}$ from increasing to a level that damages the main switch M1.

Figure 2:
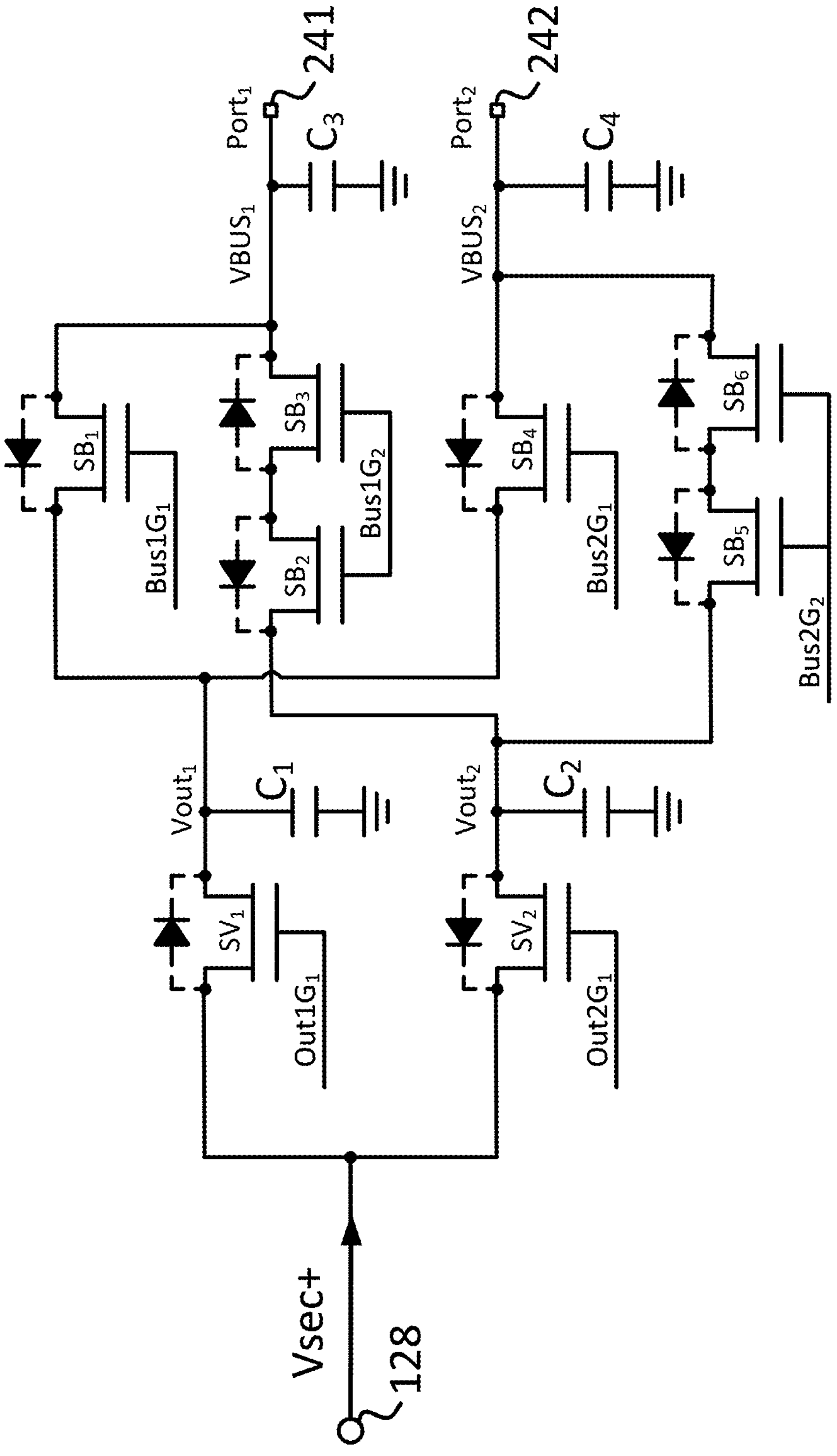
FIG. 2 is a first example embodiment of a secondary side multi-port DC output circuit of the power converter shown in FIG. 1, in accordance with some embodiments.

FIG. 2 provides a first example embodiment of the multi-port DC output circuit 130 introduced in FIG. 1, in accordance with some embodiments. In the example shown, a multi-port DC output circuit 230 includes intermediate rail voltage switches $SV_{1-2}$, bus switches $SB_{1-6}$, intermediate rail voltage buffer capacitors $C_{1-2}$, and output buffer capacitors $C_{3-4}$, connected as shown. Also shown is the output node 128 of the secondary winding 106, the secondary side output voltage Vsec+, gate control signals $Out1G_1$, $Out2G_1$, $Bus1G_{1-2}$, $Bus2G_{1-2}$, intermediate rail voltages $Vout_{1-2}$, and DC output voltages $VBUS_{1-2}$.

A first DC output port 241 is labeled $Port_1$, and a second DC output port 242 is labeled $Port_2$. In some embodiments, the gate control signals $Out1G_1$, $Out2G_1$, $Bus1G_{1-2}$, and $Bus2G_{1-2}$ are produced by the secondary side controller circuit 120. In other embodiments, the gate control signals may be produced by one or more USB port manager modules (e.g., which may be implemented using the control logic circuits 120*a*). The multi-port DC output circuit 230 advantageously works with any configuration on the AC side of the power converter 100 and is not limited to the flyback configuration shown. For example, in some embodiments, the secondary side output voltage Vsec+ at the output node 128 could be provided by an LLC power converter, etc.

As disclosed herein, the multi-port DC output circuit 230 is configured such that the intermediate rail voltage $Vout_1$ is always kept at a higher voltage than the intermediate rail voltage $Vout_2$. As shown, a parasitic body diode of the intermediate rail voltage switch $SV_1$ is forward biased with respect to the secondary side output voltage Vsec+, and a parasitic body diode of the intermediate rail voltage switch $SV_2$ is reverse biased with respect to the secondary side output voltage Vsec+.

Because of the resultant voltage drop across the body diodes of the intermediate rail voltage switches $SV_{1-2}$ discussed above, the secondary side output voltage Vsec+ will always stay at a voltage no more than a diode drop (e.g., about 0.7V) above the intermediate rail voltage $Vout_1$ and no more than a diode drop below the intermediate rail voltage $Vout_2$. This advantageously allows a single intermediate rail voltage switch ($SV_1$) to be used between Vsec+ at the node 128 and the intermediate buffer capacitor $C_1$, as well as for a single intermediate rail voltage switch ($SV_2$) to be used between Vsec+ at the node 128 and the intermediate buffer capacitor $C_2$. The voltage rating needed for $SV_1$ and $SV_2$ can thereby be limited to about 0.7V above the highest setting for the output voltage $Vout_1$, plus a small amount of margin to allow for parasitic ringing when $SV_1$ is turned ON.

The synchronous rectifier switch M2 shown in FIG. 1 (which is typical for a flyback converter) advantageously blocks the much higher voltage produced while the primary side of the transformer 102 is charging the magnetizing inductance $L_M$ and also any voltage ringing during transition times between charging and discharging the transformer magnetizing inductance $L_M$.

Recent industry trends, particularly the usage of USB Type-C power delivery, have increased the need for system awareness and control of the voltage and power levels provided to multiple DC output ports from a single AC power supply. This is sometimes implemented by each DC output port having a port manager module that communicates with connected devices and to each other to share available AC/DC power and to reduce power levels if the temperature, as monitored inside or on the system packaging, rises above a specified level. An alternative implementation is to use a single port manager module that measures and collects voltage, current, and temperature information from inside the system packaging as well as requests and information from devices connected to the ports in order to set and communicate voltage, current, and power levels for each DC output port. In some embodiments, the secondary side controller circuit 120 may include one or more DC output port manager modules and is thereby operable to control any of the example embodiments of the multi-port DC output circuit 130 disclosed herein.

Since such port manager modules can be implemented with digital control and firmware using one-time programmable (OTP) or multiple-time programmable (MTP) memory, the firmware or other programmable memory of a single port manager module can be used to drive many different switch configurations (such as those of the additional embodiments of multi-port DC output circuits disclosed herein) and also to configure how those switches are turned on and off.

If a port manager module recognizes that only a single DC output port is connected to a load, each of the intermediate output voltages $Vout_{1-2}$ can be directly provided to the particular DC output port that has a load connected to it. For example, with reference to FIG. 2, if the DC output port $Port_2$ 242 was the only output port connected to a load (e.g., a USB device), the intermediate rail voltage switches $SV_{1-2}$ and the bus switches $SB_{4-6}$ could remain ON during the switching cycle, thereby providing the lowest resistance possible between Vsec+ at the node 128 and the DC output port $Port_2$ 242.

Figure 3:
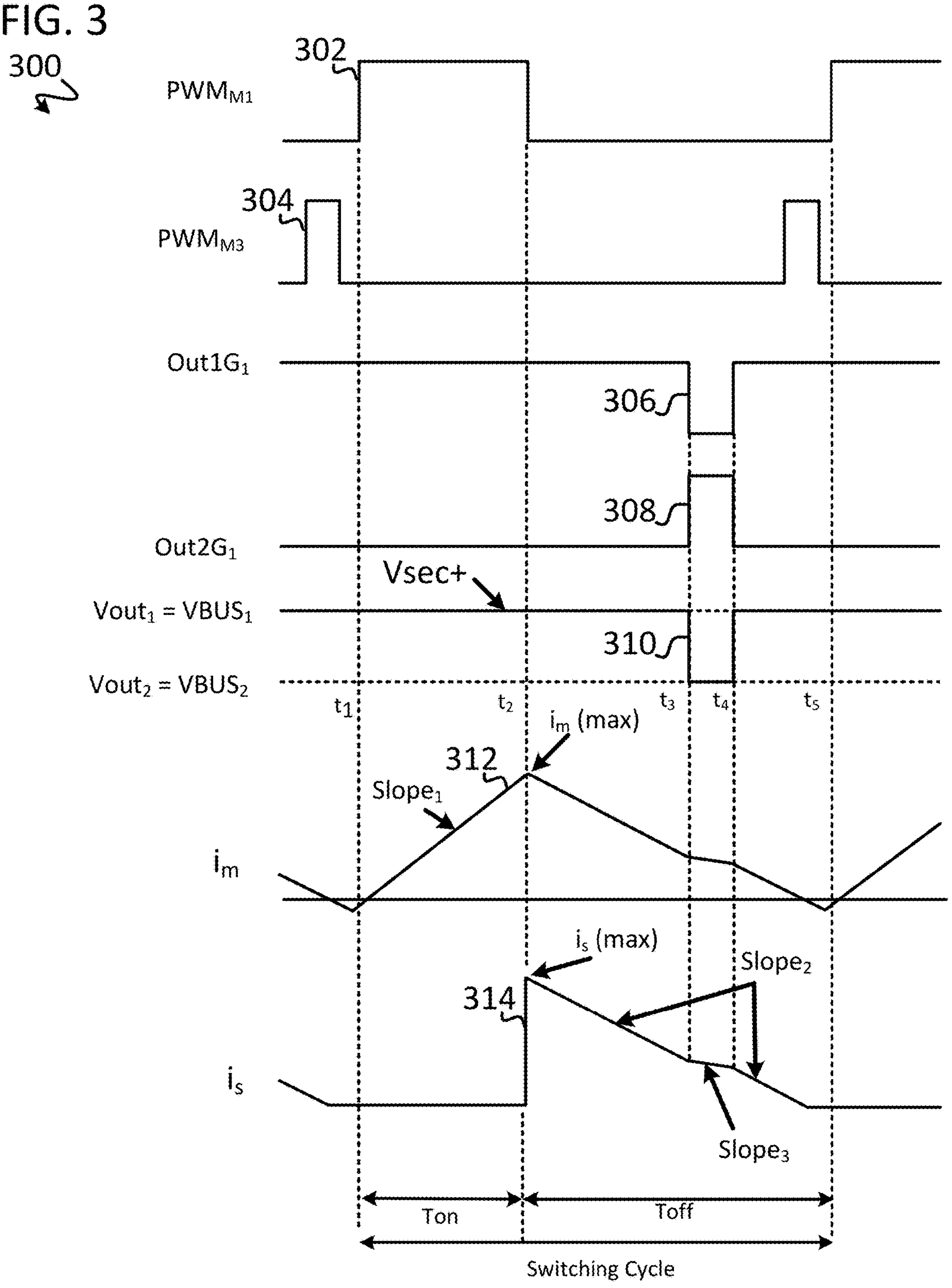
FIG. 3 shows simplified signals related to the operation of the power converter shown in FIG. 1, in accordance with some embodiments.

Operation of the power converter 100 when configured to use the multi-port DC output circuit 230 is illustrated in the simplified plots 300 shown in FIG. 3, in accordance with some embodiments. The simplified plots 300 include plots of the main switch M1 control signal $PWM_{M1}$ 302, the active clamp switch M3 control signal $PWM_{M3}$ 304, the intermediate rail voltage switch control signal $Out1G_1$ 306, the intermediate rail voltage switch control signal $Out2G_1$ 308, the secondary side output voltage Vsec+ 310, the magnetizing current $i_m$ 312, and the secondary side current $i_s$ 314, all during the same switching cycle. The switching cycle includes a first duration of time, Ton, during which the main switch M1 is enabled, and a second duration of time, Toff, during which the main switch M1 is disabled. Also shown is the intermediate rail voltage $Vout_1$, which is equal to the output voltage $VBUS_1$ in the example shown, and the intermediate rail voltage $Vout_2$, which is equal to the output voltage $VBUS_2$ in the example shown.

In the example shown, the DC output voltage at $Port_1$ and associated power levels are higher than those of $Port_2$. In this case, the bus switches $SB_1$, $SB_5$, and $SB_6$ are ON while the switches $SB_2$, $SB_3$, and $SB_4$ are OFF in order to electrically connect $Vout_1$ to $Port_1$ 241 and $Vout_2$ to $Port_2$ 242.

If, alternatively, the voltage and power delivered by $Port_2$ were requested to be higher than those of $Port_1$, then the switches $SB_2$, $SB_3$, and $SB_4$ would be turned ON and the switches $SB_1$, $SB_5$, and $SB_6$ would be turned OFF in order to electrically connect the intermediate rail voltage Vout to $Port_2$ 242 and to electrically connect the intermediate rail voltage $Vout_2$ to $Port_1$ 241.

At time $t_1$, the primary side main switch M1 is enabled by the main switch control signal $PWM_{M1}$ 302 and the magnetizing current $i_n$ 312 begins to flow through the primary winding 104 to charge the magnetizing inductance $L_M$. The intermediate rail voltage switch $SV_1$ is in an ON state based on an asserted level of the gate control signal $Out1G_1$, and the intermediate rail voltage switch $SV_2$ is in an OFF state based on a de-asserted level of the gate control signal $Out2G_1$. Between the time $t_1$ and $t_2$, the magnetizing current $i_m$ increases at a rate designated as $Slope_1$, which is equal to $$\frac{V_{in}}{L_M}.$$

During this time period, the secondary side current $i_s$ 314 is equal to 0. At time $t_2$, the magnetizing current $i_m$ 312 and the secondary side current $i_s$ 314 are at respective maximum levels for the switching cycle. Also at time $t_2$, the main switch M1 is disabled by the main switch control signal $PWM_{M1}$ 302 and the secondary side current $i_s$ 314 begins to flow to a load connected at $Port_1$ 241 of the multi-port DC output circuit 230 since the intermediate rail voltage switch $SV_1$ is ON and the intermediate rail voltage switch $SV_2$ is OFF.

Between the time $t_2$ and $t_3$, the secondary side current $i_s$ decreases at a rate designated as $Slope_2$, which is equal to $$\frac{-Vout_1}{L_{sec}}.$$

At time $t_3$, the intermediate rail voltage switch $SV_1$ is disabled via the gate control signal $Out1G_1$ 306, and the intermediate rail voltage switch $SV_2$ is enabled via the gate control signal $Out2G_2$ 308. As shown by the plot of the secondary side output voltage Vsec+ 310, the secondary side output voltage Vsec+ almost instantly (e.g., within a few nanoseconds) transitions from the intermediate rail voltage level $Vout_1$ to the intermediate rail voltage level $Vout_2$ upon state transition of the intermediate rail voltage switches $SV_{1-2}$. As such, between time $t_3$ and $t_4$, power is delivered to a load connected at $Port_2$ 242. During this period, the secondary side current decreases at a rate designated as $Slope_3$ which is equal to $$\frac{-Vout_2}{L_{sec}}.$$

At time $t_4$, the intermediate rail voltage switch $SV_1$ is re-enabled via the gate control signal Out1G$_1$ 306, and the intermediate rail voltage switch $SV_2$ is disabled via the gate control signal Out2G$_1$ 308. Once again, as shown by the plot of the secondary side output voltage Vsec+ 310, the secondary side output voltage Vsec+ almost instantly (e.g., within a few nanoseconds) transitions from the voltage level $Vout_2$ to the voltage level $Vout_1$ upon state transition of the intermediate rail voltage switches $SV_{1-2}$. As such, between time $t_4$ and $t_5$, power is once again delivered to the load connected at $Port_1$ 241. During this period, the secondary side current $i_s$ 314 decreases at the rate designated as $Slope_2$. At time $t_5$, the main switch M1 is enabled, and a new switching cycle of the power converter 100 begins.

The simplified plots 300 shown in FIG. 3 illustrate only one example for DC outputs $Port_1$ 241 and $Port_2$ 242. Voltage and power levels are in no way limited to certain voltage or power levels shown in the examples herein. For example, if the DC output $Port_2$ required a higher power level, this configuration would work as well by simply increasing the percentage of time (i.e., between $t_3$ and $t_4$) during which power is being delivered to $Port_2$ (via $Vout_2$).

In the example shown in the simplified plots 300, the secondary side transformer current $i_s$ 314 is equal to the current through the synchronous rectifier switch M2 shown in FIG. 1. Between times $t_2$ and $t_3$, when the output voltage Vsec+ is equal to the intermediate rail voltage $Vout_1$, the secondary side transformer current $i_s$ will also equal the current through the intermediate rail voltage switch $SV_1$. Similarly, between $t_3$ and $t_4$, when the output voltage Vsec+ is equal to the intermediate rail voltage $Vout_2$, the secondary side transformer current $i_s$ 314 is equal to the current through the intermediate rail voltage switch $SV_2$. Since the secondary side current $i_s$ 314 is more in the shape of a triangle wave than a square wave, and since the secondary side current $i_s$ 314 is only provided for a portion of the switching period (i.e., during Toff), the peak secondary side current will be much higher than an average secondary side current. Additionally, current through the bus switches $SB_{1-6}$ flows between two nets that have capacitors ($C_{1-4}$) and therefore has relatively low ripple voltage, thereby making the current through the bus switches closer to an average port current at all times (with much lower current peaks).

Thus, because the current through the bus switches $SB_{1-6}$ is lower than a peak secondary side current, lower-cost bus switches having a much higher RDS(on) as compared to the intermediate rail voltage switches $SV_{1-2}$ may be advantageously used in the multi-port DC output circuit 230 and still maintain acceptable power dissipation levels.

Figure 14:
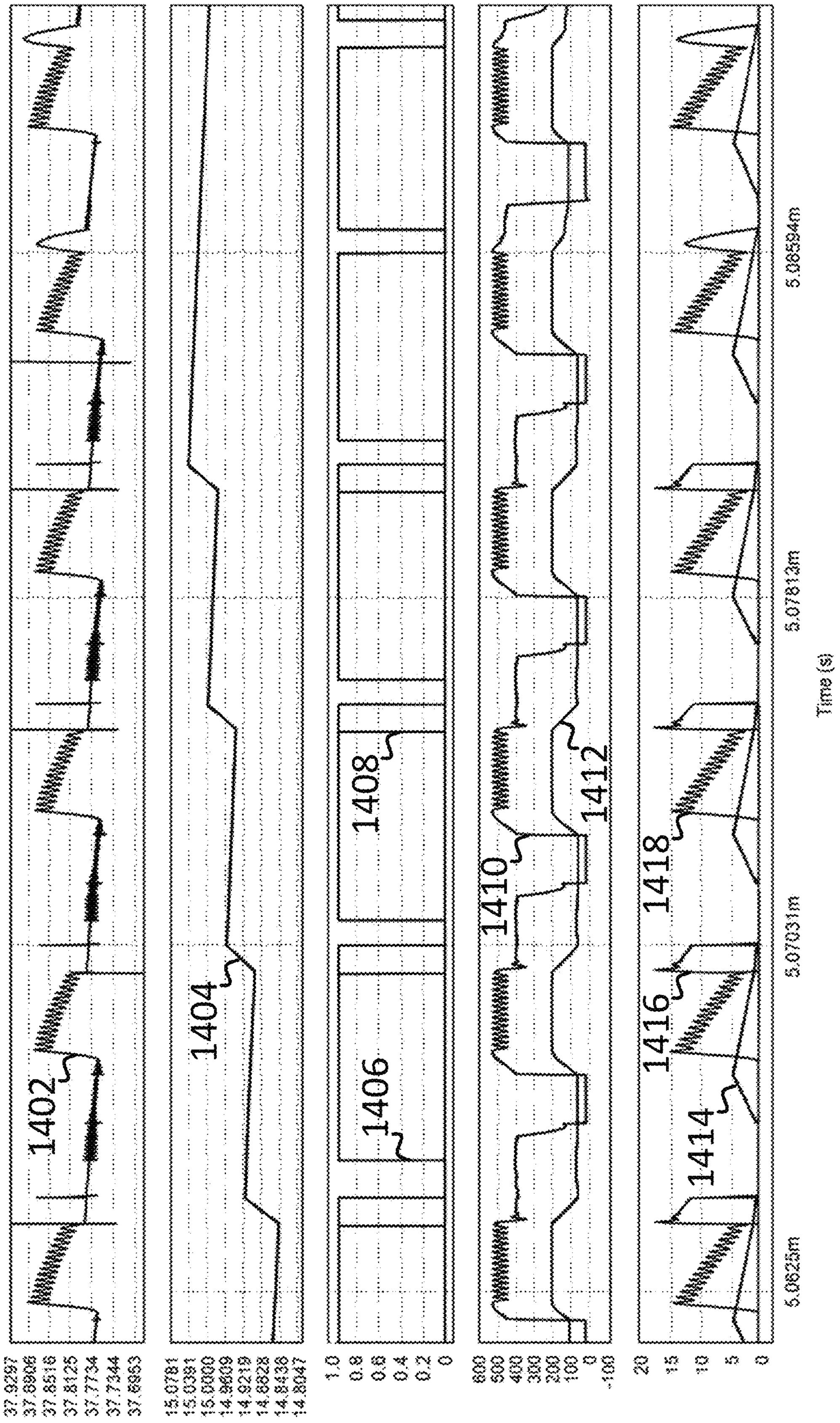
FIG. 14 shows additional simplified signals related to the operation of the power converter shown in FIG. 1, in accordance with some embodiments.

Additionally, as shown in FIG. 3 and FIG. 14 (described below), since the current waveform of the secondary side current $i_s$ 314 is a triangle or trapezoidal wave that delivers current for only a portion of each switching cycle (which is the same as for an inverting or non-inverting buck/boost DC/DC converter using a single inductor rather than a transformer), the conduction losses to one DC output port will tend to be lower if that DC output port receives current during the latter part of the triangle wave (since the peak current is lower). This can be used as an advantage by the controller to either use a higher RDS(on) switch for one DC output port that receives current only during the lower peak part of the waveform (e.g., as shown between times $t_3$ and $t_4$), or by changing when in the switching cycle a DC output port receives current depending on the temperatures of different switches, or for the lowest overall power dissipation of the entire system.

For an active clamp flyback converter, one DC output port can also be chosen to receive current during the period that the active clamp switch M3 is turned on to discharge the active clamp capacitor $C_C$, thereby increasing the output current delivered during that time. Additionally, if the lower output power is delivered at a lower voltage, the secondary side current $i_s$ waveform 314 is more trapezoidal in shape, so the current peak is not as high as for a triangle waveform (e.g., as illustrated in FIG. 14).

Alternatively, when loads connected to the DC output ports of the multi-port DC output circuits are balanced, energy savings can be achieved by always having the secondary side output voltage Vsec+ connected to the higher of the intermediate rail voltages at the beginning and the end of the main switch M1 off-time, and only turning on the active clamp switch M3 at the end of the main switch M1 off-time. Since the beginning and the end of the main switch M1 off-time are the only times where current is conducted in the active clamp switch M3, this technique limits the current spikes and thus power dissipation experienced by the active clamp switch M3.

Power dissipation in the power converter 100 tends to be less when the power dissipation levels for the switches of the multi-port DC output circuit to each DC output port thereof are equal. This may be achieved by delivering charge to each DC output port of the multi-port DC output circuit at the correct times during the off-time of the main switch M1 such that the $I^2 \times R$ losses to each output are the same. For configurations of the multi-port DC output circuits with three DC outputs, this can be achieved by delivering charge to two out of the three outputs at two different times during the off-time—for example, by delivering charge to the intermediate voltage rail for Vout at the beginning of the off-time of the main switch M1, then to the intermediate voltage rail for $Vout_2$, then to the intermediate voltage rail for $Vout_3$, then to $Vout_2$ again, and then to $Vout_1$ once more at the end of the main switch M1 off-time.

In addition to maintaining an acceptable power dissipation level of the multi-port DC output circuit 230, additional power savings may be achieved by using a low-cost charge-pump 120*c* to increase the gate control voltage Vgs of the intermediate rail voltage switches $SV_{1-2}$, generated by the gate drivers 120*b*, to further reduce their RDS(on) for circuit configurations or conditions in which they remain on and do not need to be switched during the switching cycle. For example, in many common discrete FET switches, increasing the applied gate control signal voltage Vgs from 5V to 10V results in approximately 25% reduction in on-resistance RDS(on).

One example of when the intermediate rail voltage switches $SV_{1-2}$ stay on all the time rather than switching every switching cycle is in which only a single DC output port is in use; alternatively, for the alternative embodiments in FIGS. 4-13 where two series switches exist between Vsec+ and Vout (1, 2, or 3), one of those switches can be kept on at all times for some configurations. As described below with reference to FIG. 4, in a scenario where the intermediate rail voltage $Vout_1$ is higher than the intermediate rail voltage $Vout_2$, the intermediate voltage switches $SV_1$ and $SV_4$ can be kept ON (with a higher Vgs if desired) all the time while the intermediate rail voltage switches $SV_2$ and $SV_3$ are switched during each switching cycle or every few switching cycles.

Thus, in some embodiments, the low-cost charge-pump circuit 120*c* is part of the secondary side controller circuit 120 or may be part of one or more port controller modules (not shown) that control the multi-port DC output circuits disclosed herein. In some embodiments, the output current from a single charge-pump circuit is selectively routed to two or more gates of the switches used in the multi-port DC output circuits disclosed herein. In other embodiments, multiple charge-pump circuits are used to control the switches used in the multi-port DC output circuits disclosed herein.

The charge-pump circuit 120*c* can advantageously provide a weak output current for output configurations or conditions where the intermediate rail voltage switches $SV_{1-2}$ do not switch frequently, and therefore do not need to transition state rapidly. That is, if the intermediate rail voltage switches $SV_{1-2}$ need to switch during each switching period of the power converter 100, the charge pump output current would have to be much stronger than as disclosed herein in order to achieve a high switching rate, and the switching losses due to driving the gate on to a higher Vgs every switching period could be quite high (more than offsetting the reduction in on resistance). Such switching losses account for why some form of a bootstrap voltage to a lower Vgs is typically used rather than an internal charge pump for switches that are turned on and off every switching cycle. In such embodiments, a first gate terminal of the first intermediate rail voltage switch $SV_1$ is configured to receive the output of a charge pump circuit of the charge pump circuits 120*c* via the gate driver circuits 120*b*. Similarly, a second gate terminal of the second intermediate rail voltage switch $SV_2$ is configured to receive the output of a charge pump circuit of the charge pump circuits 120*c* via the gate driver circuits 120*b*. As mentioned above, in some embodiments, each of the intermediate rail voltage switches $SV_{1-2}$ is associated with a dedicated charge pump circuit of the charge pump circuits 120*c*. In other embodiments, a single charge pump circuit of the charge pump circuits 120*c* is used to control multiple switches.

As disclosed herein, for some cost-sensitive systems, two intermediate voltage rails are operable to provide power (i.e., $Vout_{1-2}$) to more than two DC output ports. For example, a popular USB port configuration is to have two USB Type-C ports and one USB Type-A port (i.e., to mostly service older USB devices). For such systems, it is often unlikely that all three ports will be plugged in at the same time, and if they are, it may be acceptable if the port or system's output power capability is not as high and/or some restrictions are placed on voltage levels for one or more of the ports.

As disclosed herein, one technique to provide power to more DC output ports than the number of intermediate rail voltages (e.g., two intermediate rail voltages supplying power to three DC output ports) is to provide power to two DC output ports that have the same voltage with a single intermediate voltage rail. For USB power delivery as an example, two DC output ports having the same output voltage is a relatively common occurrence as many devices will set their output voltage to either 5V, 9V, 15V, or 20V (with a few higher voltages up to 45V also available as part of the newer USB "extended power range"). Since the current delivered to each DC output port is typically monitored using the RDS(on) of one of the bus switches (e.g., $SB_{1-6}$) or via a resistor in series with those switches, the current can still be monitored and the gate control signal voltage Vgs of those bus switches may be regulated to reduce the current to one DC output port while not affecting the other(s).

This technique can also be utilized if, for example, only two devices that both require the same output voltage are connected to the multi-port DC output circuit. In such instances, both DC output ports could be electrically connected to both of the intermediate rail voltages in order to advantageously leave the intermediate rail voltage switches $SV_{1-2}$ ON throughout the switching cycle.

Several alternative example embodiments of multi-port DC output circuits for realizing the multi-port DC output circuit 130 are disclosed herein. Each embodiment is operable to work with the same type of port manager chip or chips and with the same type of charge pump circuit as disclosed herein.

Figure 4:
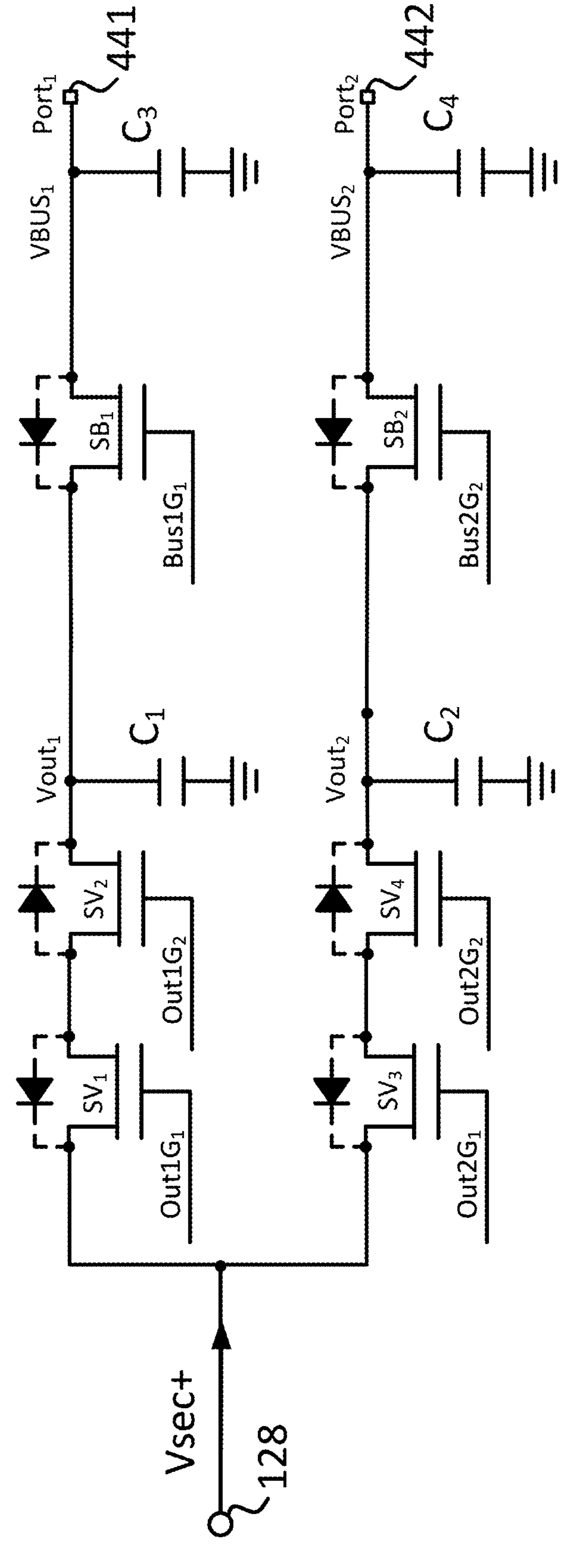
FIGS. 4-13 show additional example embodiments of secondary side multi-port DC output circuits, in accordance with some embodiments.

FIG. 4 provides a second example embodiment of the multi-port DC output circuit 130 introduced in FIG. 1, in accordance with some embodiments. In the example shown, a multi-port DC output circuit 430 includes intermediate rail voltage switches $SV_{1-4}$, bus switches $SB_{1-2}$, intermediate buffer capacitors $C_{1-2}$, and output buffer capacitors $C_{3-4}$, connected as shown. Also shown is the output node 128 of the secondary winding 106, the secondary side output voltage Vsec+, gate control signals Out1$G_{1-2}$, Out2$G_{1-2}$, Bus1$G_1$, Bus2$G_1$, intermediate rail voltages $Vout_{1-2}$, and output voltages $VBUS_{1-2}$. A first DC output port 441 is labeled $Port_1$, and a second DC output port 442 is labeled $Port_2$. In some embodiments, the gate control signals Out1$G_{1-2}$, Out2$G_{1-2}$, Bus1$G_1$, and Bus2$G_1$ are produced by the secondary side controller circuit 120 or one or more port manager modules. The multi-port DC output circuit 430 advantageously works with any configuration on the AC side of the power converter 100 and is not limited to the flyback configuration shown. In the example shown, there are a total of six switches (plus the synchronous rectifier switch M2 shown in FIG. 1), but only one of the intermediate rail voltage switches $SV_{1-4}$ in each power path needs to transition state during each switching cycle.

In some embodiments of the multi-port DC output circuits disclosed herein, pairs of serially connected intermediate rail voltage switches, such as $SV_{1-2}$ and $SV_{3-4}$, are configured for independent control such that one of the serially connected switches within a pair remains on throughout a switching cycle and the other switch may be transitioned more frequently. In such embodiments, a low-cost charge pump circuit (i.e., having a weak output drive) as described above may provide a gate control signal to the intermediate rail voltage switches which remain on, and it can drive those always ON switches Vgs to a higher voltage than other switches, thereby advantageously reducing the RDS(on) of those switches. For example, if the intermediate rail voltage $Vout_1$ is higher than the intermediate rail voltage $Vout_2$, the intermediate rail voltage switches $SV_2$ and $SV_3$ of the multi-port DC output circuit 430 may driven by a low-cost (i.e., having a weak output) charge pump to remain enabled for a duration of the switching cycle while the intermediate rail voltage switches $SV_1$ and $SV_4$ may transition state depending on power deliver requirements to loads of the multi-port DC output circuit 430.

Figure 5:
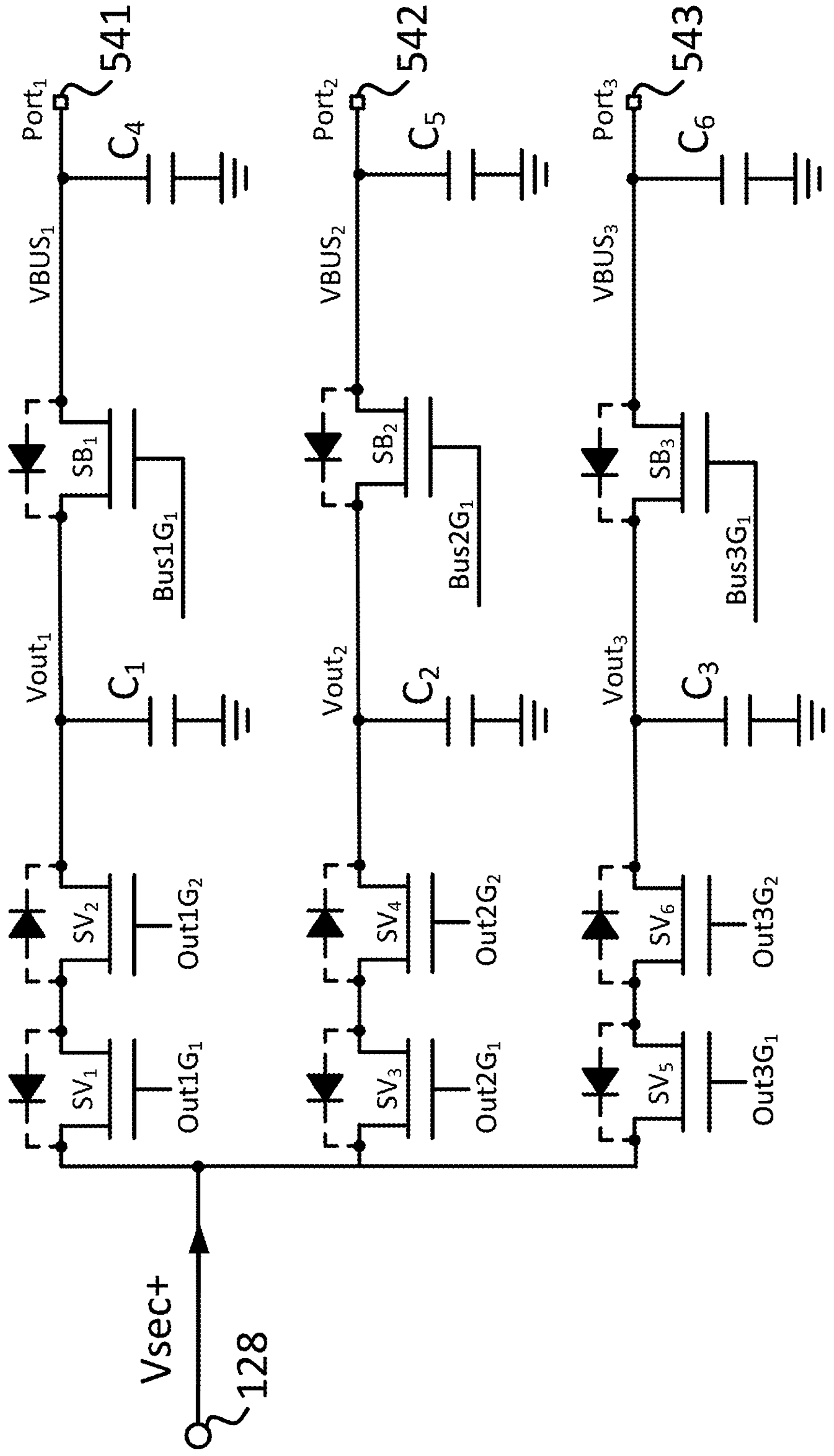

FIG. 5 provides a third example embodiment of the multi-port DC output circuit 130 introduced in FIG. 1, in accordance with some embodiments. In the example shown, a multi-port DC output circuit 530 includes intermediate rail voltage switches $SV_{1-6}$, bus switches $SB_{1-3}$, intermediate buffer capacitors $C_{1-3}$, and output buffer capacitors $C_{4-6}$, connected as shown. Also shown is the output node 128 of the secondary winding 106, the secondary side output voltage Vsec+, gate control signals Out1$G_{1-2}$, Out2$G_{1-2}$, Out3$G_{1-2}$, Bus1$G_1$, Bus2$G_1$, Bus3$G_1$, intermediate rail voltages $Vout_{1-3}$, and output voltages $VBUS_{1-3}$. A first DC output port 541 is labeled $Port_1$, a second DC output port 542 is labeled $Port_2$, and a third DC output port 543 is labeled $Port_3$. In some embodiments, the gate control signals are produced by the secondary side controller circuit 120 or by one or more port manager modules. The multi-port DC output circuit 530 advantageously works with any configuration on the AC side of the power converter 100 and is not limited to the flyback configuration shown.

In the example shown, there are a total of nine switches (plus the synchronous rectifier switch M2 shown in FIG. 1) used to deliver power to the DC output ports and may advantageously provide power to a USB Type-A port with no restrictions. Some thermal throttling may be implemented to deliver up to 65 W on some output voltage/current combinations.

Figure 6:
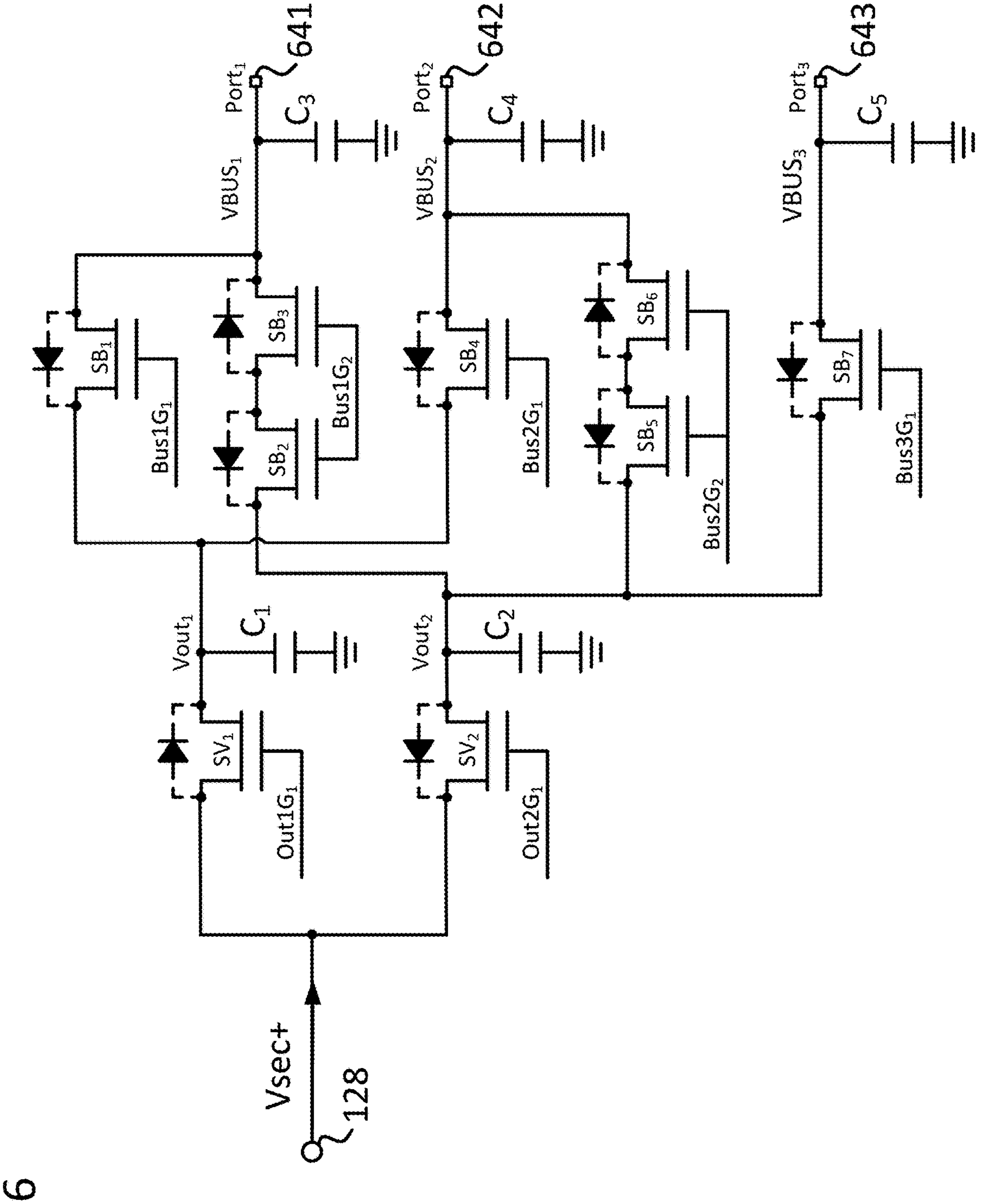

FIG. 6 provides a fourth example embodiment of the multi-port DC output circuit 130 introduced in FIG. 1, in accordance with some embodiments. In the example shown, a multi-port DC output circuit 630 includes intermediate rail voltage switches $SV_{1-2}$, bus switches $SB_{1-7}$, intermediate buffer capacitors $C_{1-2}$, and output buffer capacitors $C_{3-5}$, connected as shown. Also shown is the output node 128 of the secondary winding 106, the secondary side output voltage Vsec+, gate control signals Out1$G_1$, Out2$G_1$, Bus1$G_{1-2}$, Bus2$G_{1-2}$, Bus3$G_1$, intermediate rail voltages $Vout_{1-2}$, and output voltages $VBUS_{1-3}$. A first DC output port 641 is labeled $Port_1$, a second DC output port 642 is labeled $Port_2$, and a third DC output port 643 is labeled $Port_3$. In some embodiments, the gate control signals are produced by the secondary side controller circuit 120 or one or more port manager modules. The multi-port DC output circuit 630 advantageously works with any configuration on the AC side of the power converter 100 and is not limited to the flyback configuration shown.

In the example shown, there are a total of nine switches (plus the synchronous rectifier switch M2 shown in FIG. 1) used to deliver power to the DC output ports, but only the intermediate rail voltage switches, $SV_{1-2}$ (plus the synchronous rectifier switch M2) are implemented using more expensive, low RDS(on) switches. If all three DC output ports $Port_{1-3}$ are used simultaneously, the output voltage $VBUS_3$ must be the same voltage as either $VBUS_{1-2}$, with the other output voltage being the same or higher voltage. If only one USB Type-C load is connected, a USB Type-A load (if present) needs to be at a lower voltage than that of the USB Type-C load.

Figure 7:
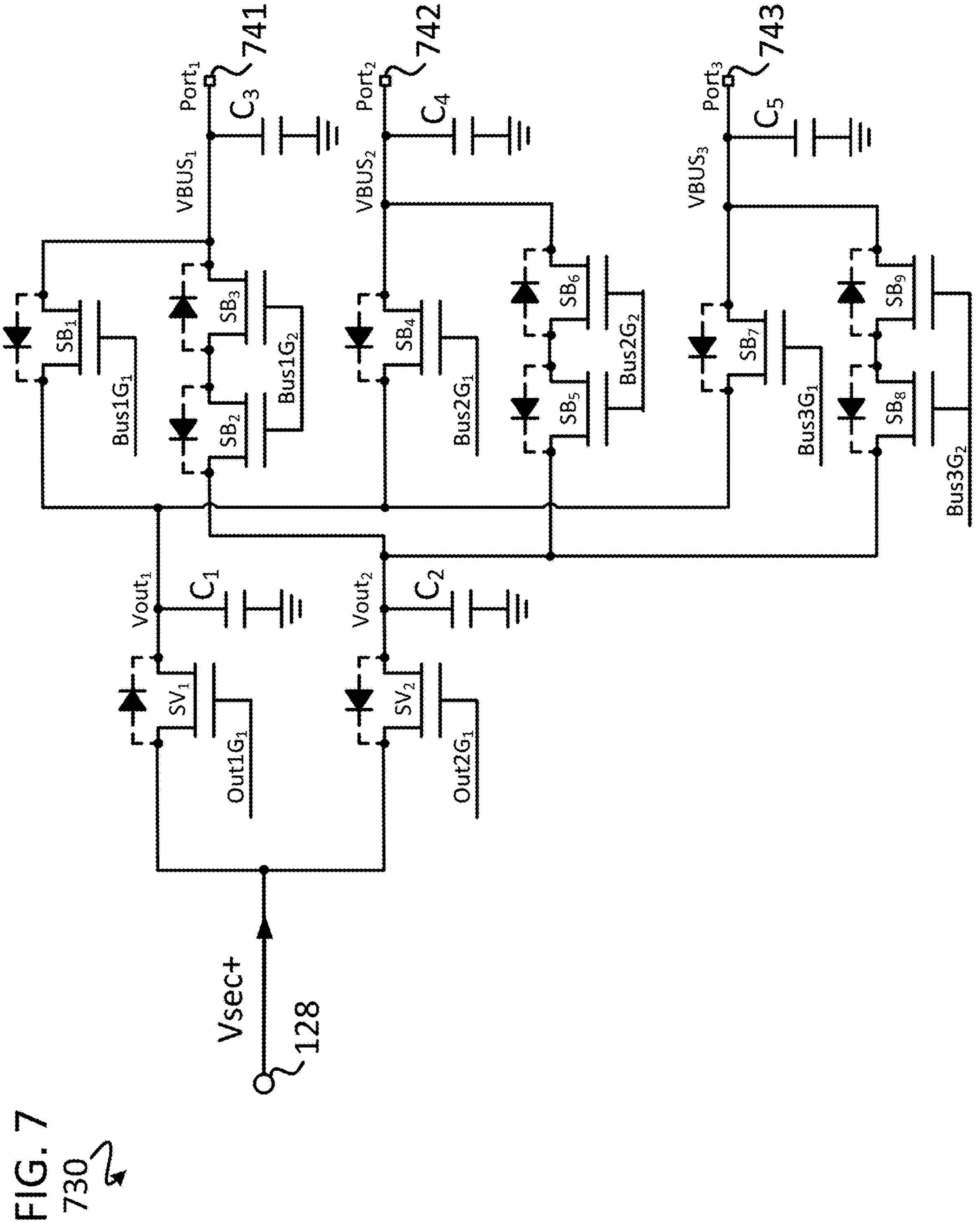

FIG. 7 provides a fifth example embodiment of the multi-port DC output circuit 130 introduced in FIG. 1, in accordance with some embodiments. In the example shown, a multi-port DC output circuit 730 includes intermediate rail voltage switches $SV_{1-2}$, bus switches $SB_{1-9}$, intermediate buffer capacitors $C_{1-2}$, and output buffer capacitors $C_{3-5}$, connected as shown. Also shown is the output node 128 of the secondary winding 106, the secondary side output voltage Vsec+, gate control signals Out1$G_1$, Out2$G_1$, Bus1$G_{1-2}$, Bus2$G_{1-2}$, Bus3$G_{1-2}$, intermediate rail voltages $Vout_{1-2}$, and output voltages $VBUS_{1-3}$. A first DC output port 741 is labeled $Port_1$, a second DC output port 742 is labeled $Port_2$, and a third DC output port 743 is labeled $Port_3$. In some embodiments, the gate control signals are produced by the secondary side controller circuit 120 or one or more port manager modules. The multi-port DC output circuit 730 advantageously works with any configuration on the AC side of the power converter 100 and is not limited to the flyback configuration shown.

In the example shown, there are a total of eleven switches (plus the synchronous rectifier switch M2 shown in FIG. 1) used to deliver power to the DC output ports, but only the two intermediate rail voltage switches, $SV_1$, $SV_2$, (plus the synchronous rectifier switch M2) are implemented using more expensive, low RDS(on) switches. If all three output ports $Port_{1-3}$ are used simultaneously, the output voltage $VBUS_3$ must be the same voltage as either $VBUS_1$ or $VBUS_2$, with the other output voltage being the same or higher voltage. If only one or two output voltage ports are used, they may be used without restriction on their respective output voltages.

Figure 8:
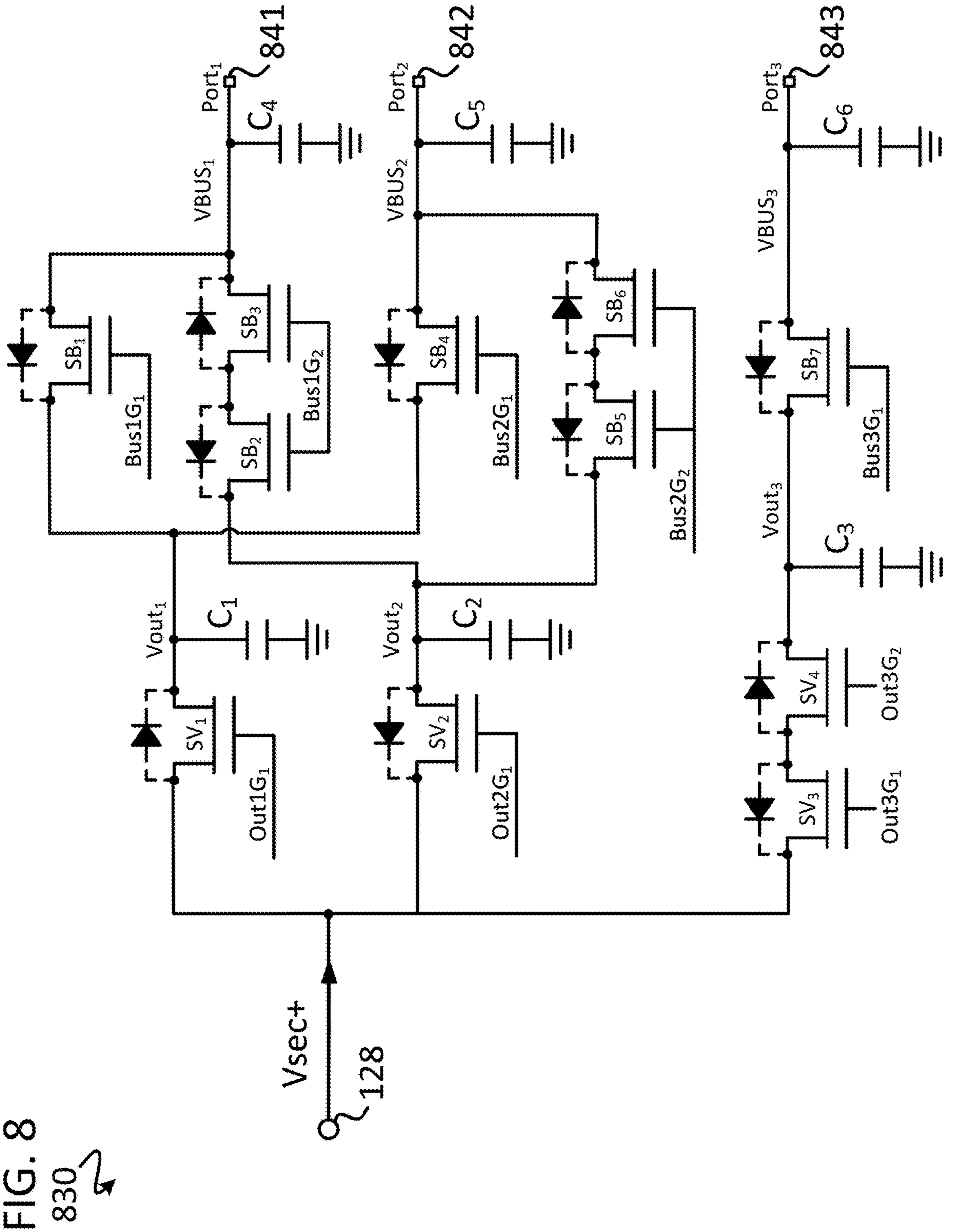

FIG. 8 provides a sixth example embodiment of the multi-port DC output circuit 130 introduced in FIG. 1, in accordance with some embodiments. In the example shown, a multi-port DC output circuit 830 includes intermediate rail voltage switches $SV_{1-4}$, bus switches $SB_{1-7}$, intermediate buffer capacitors $C_{1-3}$, and output buffer capacitors $C_{4-6}$, connected as shown. Also shown is the output node 128 of the secondary winding 106, the secondary side output voltage Vsec+, gate control signals Out1$G_1$, Out2$G_1$, Out3$G_{1-2}$, Bus1$G_{1-2}$, Bus2$G_{1-2}$, Bus3$G_1$, intermediate rail voltages $Vout_{1-3}$, and output voltages $VBUS_{1-3}$. A first DC output port 841 is labeled $Port_1$, a second DC output port 842 is labeled $Port_2$, and a third DC output port 843 is labeled $Port_3$. In some embodiments, the gate control signals are produced by the secondary side controller circuit 120. The multi-port DC output circuit 830 advantageously works with any configuration on the AC side of the power converter 100 and is not limited to the flyback configuration shown.

In the example shown, there are a total of eleven switches (plus the synchronous rectifier switch M2 shown in FIG. 1) used to deliver power to the DC output ports, but only two of the intermediate rail voltage switches, $SV_1$, $SV_2$, (plus the synchronous rectifier switch M2) are implemented using more expensive, low RDS(on) switches. If all three DC output ports $Port_{1-3}$ are used simultaneously, the output voltage $VBUS_3$ must be the same voltage, or a higher voltage, than one of the output voltages of $VBUS_{1,2}$, and $VBUS_3$ must also be the same or lower voltage than the remaining output voltage of $VBUS_{1,2}$. For example, if $VBUS_3$ is equal to 20V and $VBUS_1$ is equal to 9V, configuring $VBUS_2$ to 5V would not work since $Vout_1$ would be charged to $VBUS_3$. However, in this scenario, setting $VBUS_3$ to 9V would perform correctly. If only one or two output voltage ports are used, they may be used without restriction on their respective output voltages.

Figure 9:
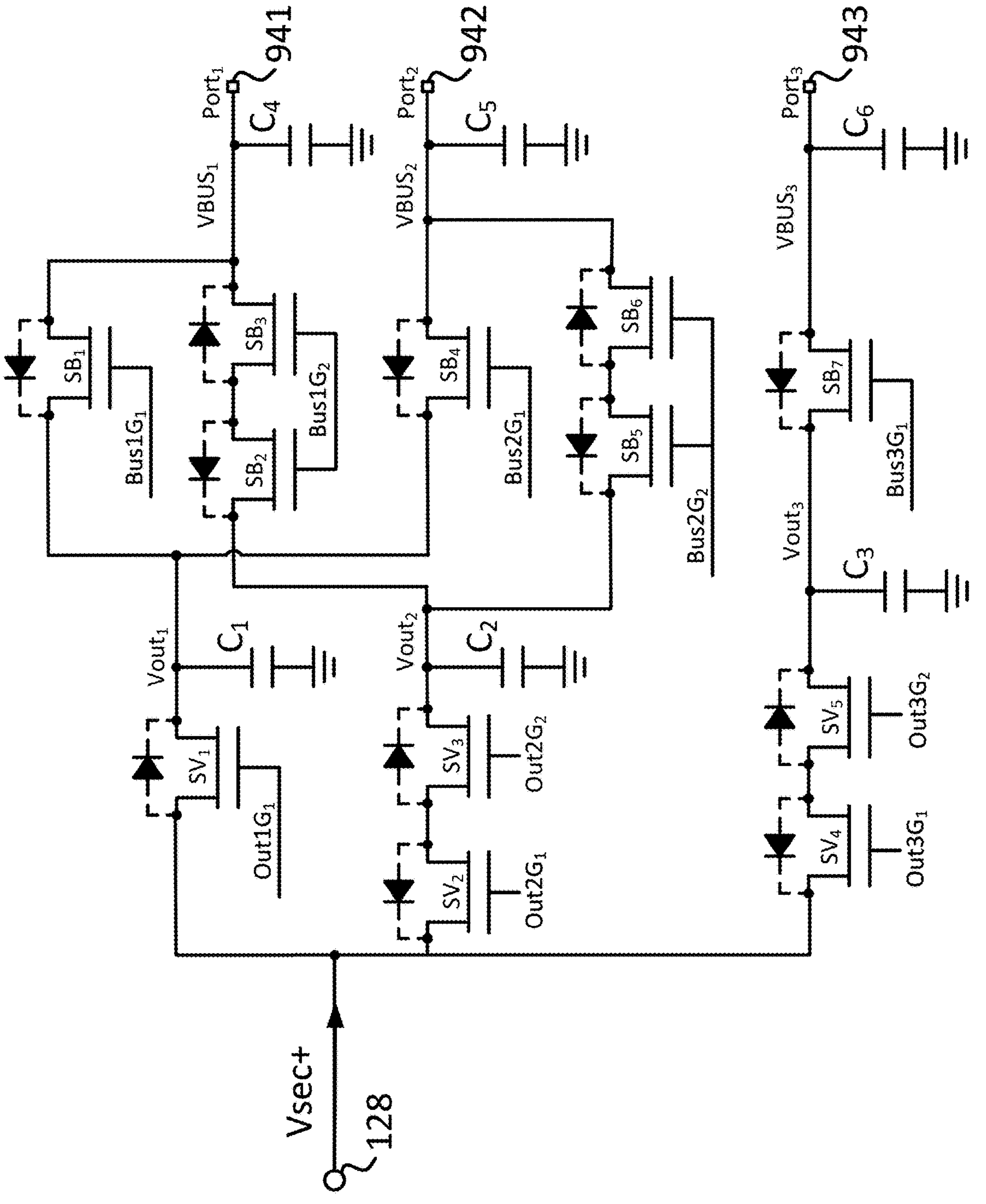

FIG. 9 provides a seventh example embodiment of the multi-port DC output circuit 130 introduced in FIG. 1, in accordance with some embodiments. In the example shown, a multi-port DC output circuit 930 includes intermediate rail voltage switches $SV_{1-5}$, bus switches $SB_{1-7}$, intermediate buffer capacitors $C_{1-3}$, and output buffer capacitors $C_{4-6}$, connected as shown. Also shown is the output node 128 of the secondary winding 106, the secondary side output voltage Vsec+, gate control signals Out1$G_1$, Out2$G_{1-2}$, Out3$G_{1-2}$, Bus1$G_{1-2}$, Bus2$G_{1-2}$, Bus3$G_1$, intermediate rail voltages $Vout_{1-3}$, and output voltages $VBUS_{1-3}$. A first DC output port 941 is labeled $Port_1$, a second DC output port 942 is labeled $Port_2$, and a third DC output port 943 is labeled $Port_3$. In some embodiments, the gate control signals are produced by the secondary side controller circuit 120 or one or more port manager modules. The multi-port DC output circuit 930 advantageously works with any configuration on the AC side of the power converter 100 and is not limited to the flyback configuration shown.

In the example shown, there are a total of twelve switches (plus the synchronous rectifier switch M2 shown in FIG. 1) used to deliver power to the DC output ports. The multi-port DC output circuit 930 is operable to provide power to a USB Type-A port with the only restriction that the USB Type-A port cannot be a higher voltage than either of the other two DC output ports. Some thermal throttling may be implemented to deliver up to 65 W on some output voltage/current combinations.

Figure 10:
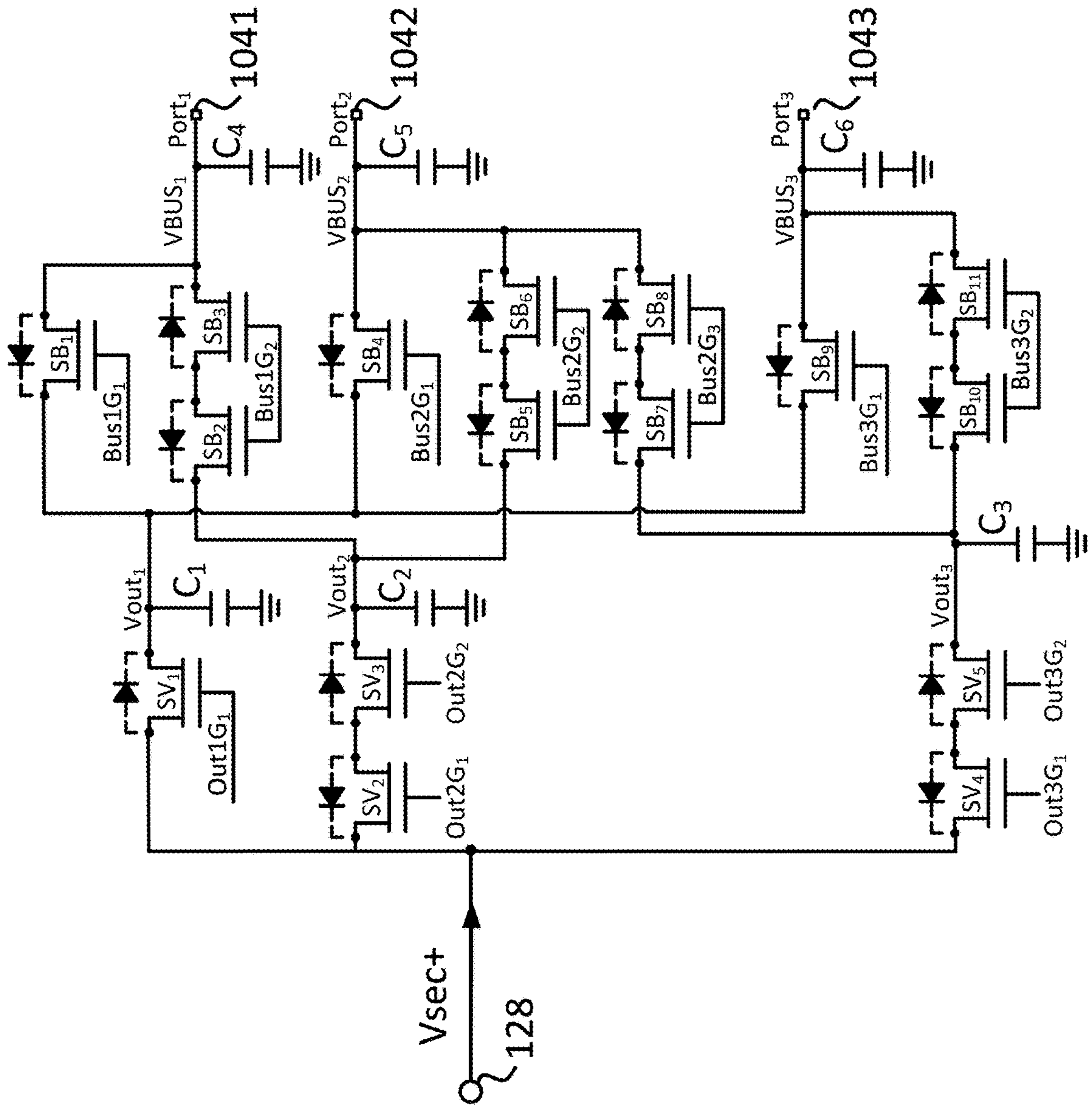

FIG. 10 provides an eighth example embodiment of the multi-port DC output circuit 130 introduced in FIG. 1, in accordance with some embodiments. In the example shown, a multi-port DC output circuit 1030 includes intermediate rail voltage switches $SV_{1-5}$, bus switches $SB_{1-11}$, intermediate buffer capacitors $C_{1-3}$, and output buffer capacitors $C_{4-6}$, connected as shown. Also shown is the output node 128 of the secondary winding 106, the secondary side output voltage Vsec+, gate control signals $Out1G_1$, $Out2G_{1-2}$, $Out3G_{1-2}$, $Bus1G_{1-2}$, $Bus2G_{1-3}$, $Bus3G_{1-2}$, intermediate rail voltages $Vout_{1-3}$, and output voltages $VBUS_{1-3}$. A first DC output port 1041 is labeled $Port_1$, a second DC output port 1042 is labeled $Port_2$, and a third DC output port 1043 is labeled $Port_3$. In some embodiments, the gate control signals are produced by the secondary side controller circuit 120 or one or more port manager circuits. The multi-port DC output circuit 1030 advantageously works with any configuration on the AC side of the power converter 100 and is not limited to the flyback configuration shown.

In the example shown, there are a total of sixteen switches (plus the synchronous rectifier switch M2 shown in FIG. 1) used to deliver power to the DC output ports. In some embodiments, each of the intermediate rail voltage switches $SV_{1-5}$ may be implemented using low RDS(on) switches to reduce power dissipation since each will experience the higher current peaks of the secondary winding 106. However, in other embodiments, the intermediate rail voltage switches $SV_{4-5}$ may be implemented as higher RDS(on) switches without penalty if they are always turned on later in the switching cycle since the secondary side current $i_{sec}$ at that time will be lower than at the beginning of the off-time of the main switch M1.

The multi-port DC output circuit 1030 is operable to provide power to a USB Type-A port with no voltage restrictions on the other two ports. Some thermal throttling may be implemented to deliver up to 65 W on some output voltage/current combinations.

Figure 11:
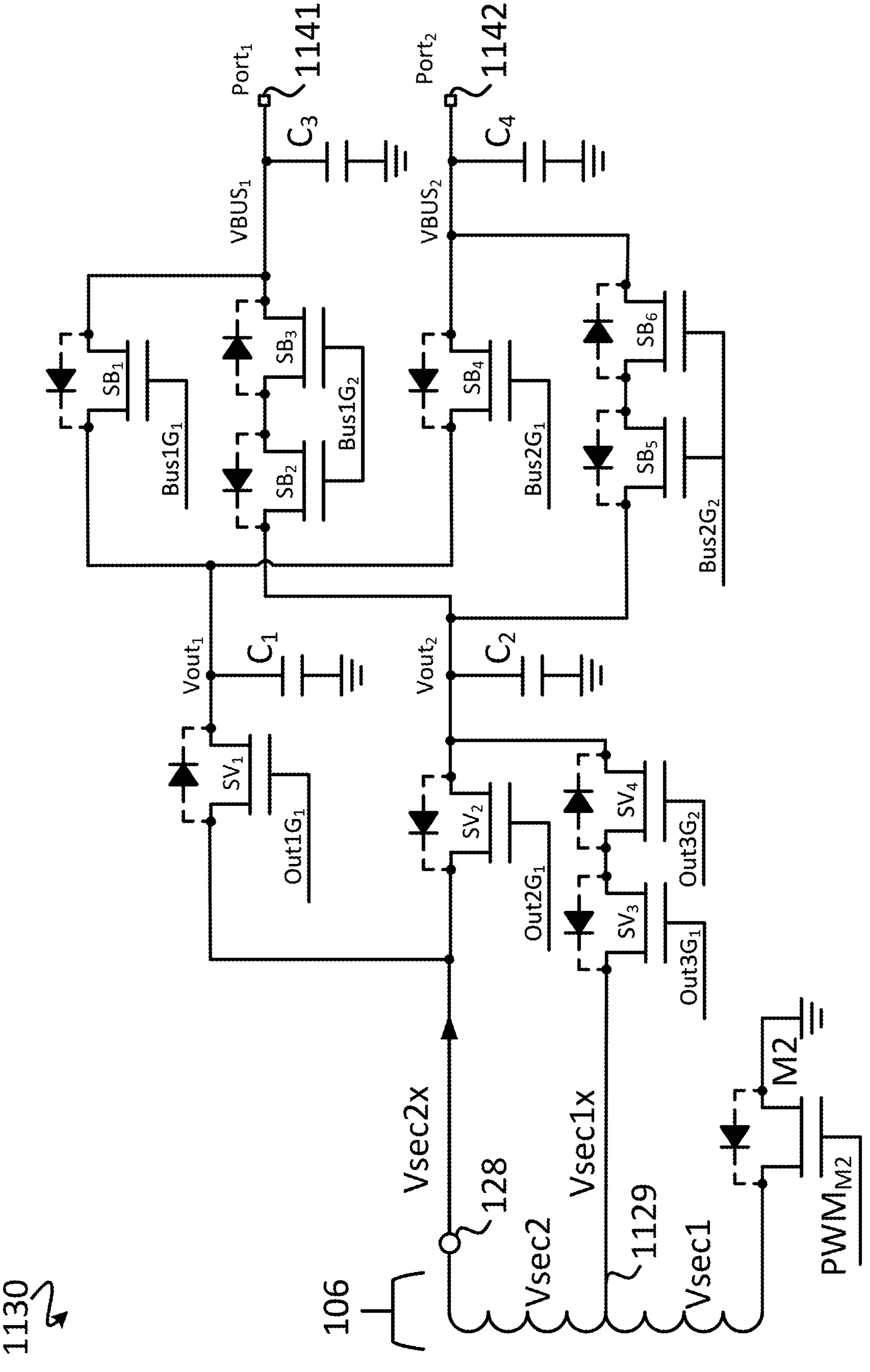

FIG. 11 provides a ninth example embodiment of the multi-port DC output circuit 130 introduced in FIG. 1, in accordance with some embodiments. In the example shown, a multi-port DC output circuit 1130 includes intermediate rail voltage switches $SV_{1-4}$, bus switches $SB_{1-6}$, intermediate buffer capacitors $C_{1-2}$, and output buffer capacitors $C_{3-4}$, connected as shown. Also shown is an alternative embodiment of the secondary winding 106 having a center tap 1129 which divides the output voltage of the secondary winding 106 into two secondary side output voltages Vsec1 and Vsec2. The secondary winding 106 thereby produces a first voltage designated Vsec1*x*, and a second voltage Vsec2*x* which is two times the voltage level of Vsec1*x*. Also shown is the synchronous rectifier switch M2, gate control signals $PWM_{M2}$, $Out1G_1$, $Out2G_1$, $Out3G_{1-2}$, $Bus1G_{1-2}$, $Bus2G_{1-2}$, intermediate rail voltages $Vout_{1-2}$, and output voltages $VBUS_{1-2}$. A first DC output port 1141 is labeled $Port_1$, and a second DC output port 1142 is labeled $Port_2$. In some embodiments, the gate control signals are produced by the secondary side controller circuit 120 or one or more port manager modules. The multi-port DC output circuit 1130 advantageously works with any configuration on the AC side of the power converter 100 and is not limited to the flyback configuration shown.

In the example shown, there are a total of ten switches (plus the synchronous rectifier switch M2) used to deliver power to the DC output ports. The center tap 1129 of the secondary side winding provides significant improvements to the power dissipation of the multi-port DC output circuit 1130 as compared to the multi-port DC output circuit 230 when the intermediate rail voltages $Vout_1$ and $Vout_2$ are far apart in voltage levels.

Figure 12:
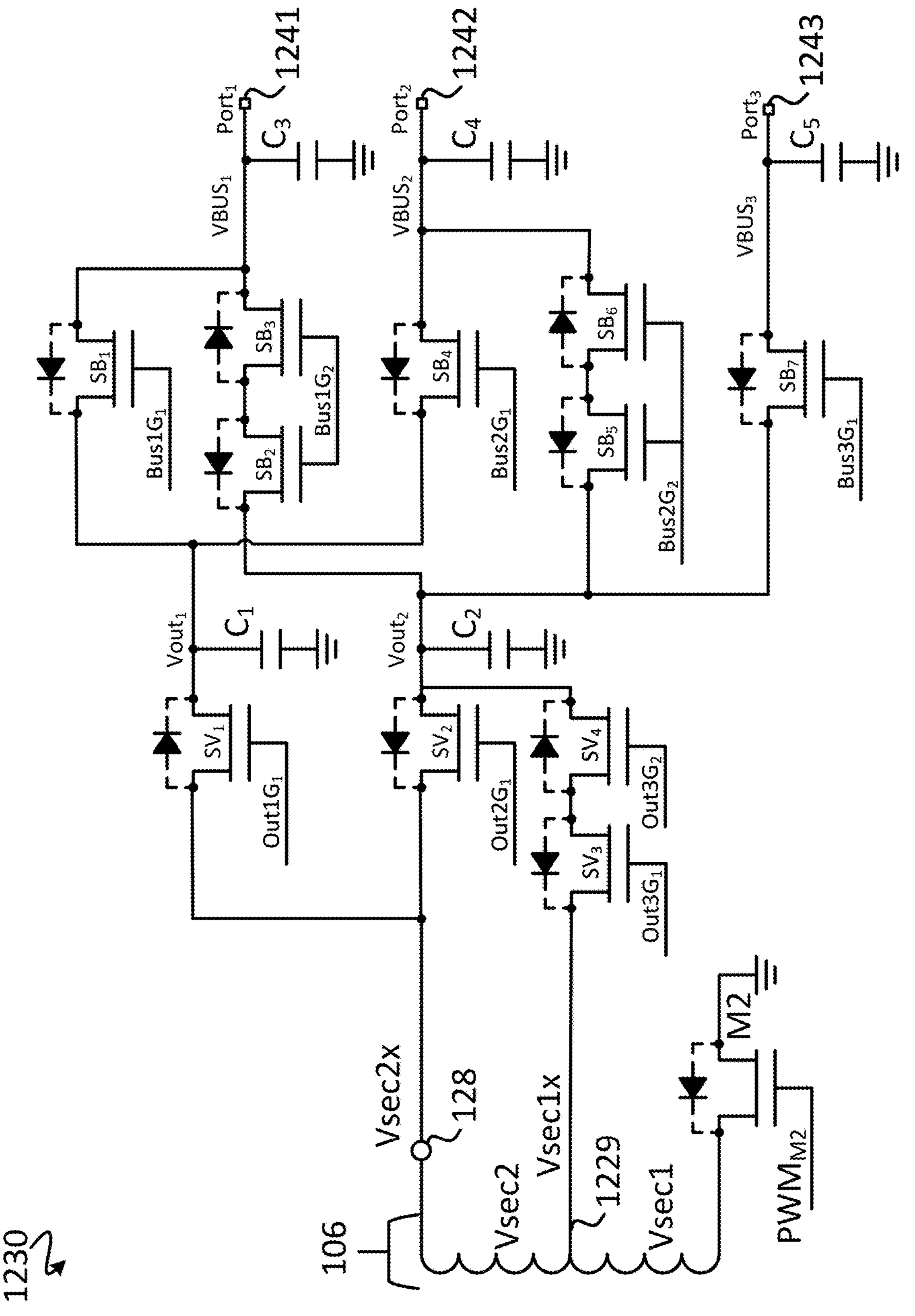

FIG. 12 provides a tenth example embodiment of the multi-port DC output circuit 130 introduced in FIG. 1, in accordance with some embodiments. In the example shown, a multi-port DC output circuit 1230 includes intermediate rail voltage switches $SV_{1-4}$, bus switches $SB_{1-7}$, intermediate buffer capacitors $C_{1-2}$, and output buffer capacitors $C_{3-5}$, connected as shown. Also shown is an alternative embodiment of the secondary winding 106 having a center tap 1229 which divides the output voltage of the secondary winding 106 into two secondary side output voltages Vsec1 and Vsec2. The secondary winding 106 thereby produces a first voltage designated Vsec1*x*, and a second voltage Vsec2*x* which is two times the voltage level of Vsec1*x* (however, in other embodiments, the second voltage may have a different ratio to the first voltage level depending on the configuration of the secondary winding tap). Also shown is the synchronous rectifier switch M2, gate control signals $PWM_{M2}$, $Out1G_1$, $Out2G_1$, $Out3G_{1-2}$, $Bus1G_{1-2}$, $Bus2G_{1-2}$, $Bus3G_1$, intermediate rail voltages $Vout_{1-2}$, and output voltages $VBUS_{1-3}$. A first DC output port 1241 is labeled $Port_1$, a second DC output port 1242 is labeled $Port_2$, and a third DC output port 1243 is labeled $Port_3$. In some embodiments, the gate control signals are produced by the secondary side controller circuit 120 or one or more port manager modules. The multi-port DC output circuit 1230 advantageously works with any configuration on the AC side of the power converter 100 and is not limited to the flyback configuration shown.

In the example shown, there are a total of 11 switches (plus the synchronous rectifier switch M2) used to deliver power to the DC output ports, but only the intermediate rail voltage switches, $SV_{1-4}$, plus the synchronous rectifier switch M2 need to be implemented as low RDS(on) switches to reduce power dissipation. The center tap 1229 of the secondary side winding provides significant improvements to the power dissipation of the multi-port DC output circuit 1230 as compared to the multi-port DC output circuit 630 when the intermediate rail voltages $Vout_1$ and $Vout_2$ are far apart in voltage level. If all three DC output ports $Port_{1-3}$ are used at the same time, $VBUS_3$ must have the same output voltage as either $VBUS_1$ or $VBUS_2$, with the remaining output voltage having the same or higher voltage. If only one USB Type-C and USB Type-A device is connected, the USB Type-A device must be at the same or lower voltage as that of the USB Type-C device.

Figure 13:
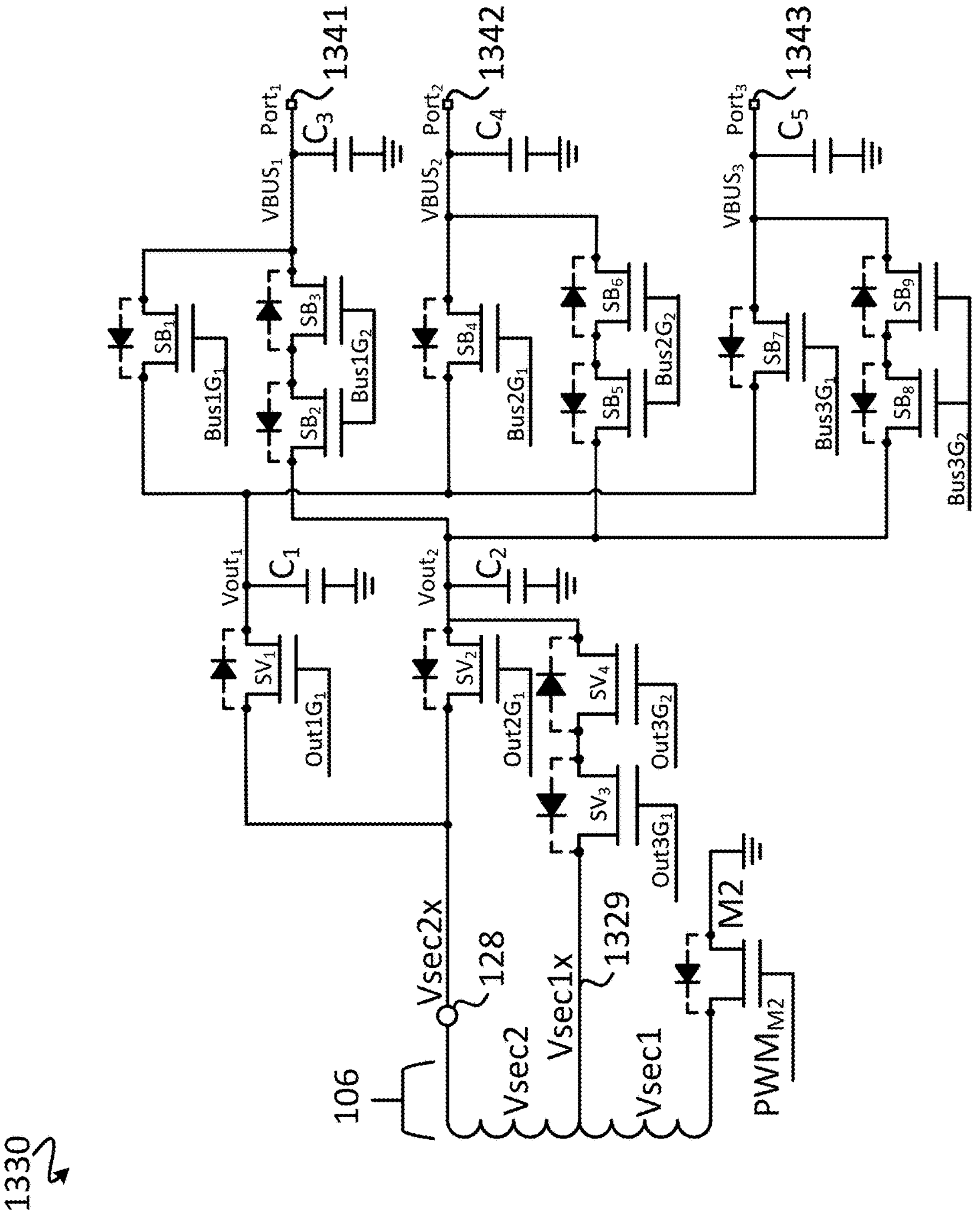

FIG. 13 provides an eleventh example embodiment of the multi-port DC output circuit 130 introduced in FIG. 1, in accordance with some embodiments. In the example shown, a multi-port DC output circuit 1330 includes intermediate rail voltage switches $SV_{1-4}$, bus switches $SB_{1-9}$, intermediate buffer capacitors $C_{1-2}$, and output buffer capacitors $C_{3-5}$, connected as shown. Also shown is an alternative embodiment of the secondary winding 106 having a center tap 1329 which divides the output voltage of the secondary winding 106 into two secondary side output voltages Vsec1 and Vsec2. The secondary winding 106 thereby produces a first voltage designated Vsec1*x*, and a second voltage Vsec2*x* which is two times the voltage level of Vsec1*x*. Also shown is the synchronous rectifier switch M2, gate control signals $PWM_{M2}$, $Out1G_1$, $Out2G_1$, $Out3G_{1-2}$, $Bus1G_{1-2}$, $Bus2G_{1-2}$, $Bus3G_{1-2}$, intermediate rail voltages $Vout_{1-2}$, and output voltages $VBUS_{1-3}$. A first DC output port 1341 is labeled $Port_1$, a second DC output port 1342 is labeled $Port_2$, and a third DC output port 1343 is labeled $Port_3$. In some embodiments, the gate control signals are produced by the secondary side controller circuit 120 or one or more port manager modules. The multi-port DC output circuit 1330 advantageously works with any configuration on the AC side of the power converter 100 and is not limited to the flyback configuration shown.

In the example shown, there are a total of 13 switches (plus the synchronous rectifier switch M2) used to deliver power to the DC output ports, but only two of the intermediate rail voltage switches, $SV_{1-4}$, plus the synchronous rectifier switch M2 need to be implemented as low RDS(on) switches to reduce power dissipation. The center tap 1329 of the secondary side winding provides significant improvements to the power dissipation of the multi-port DC output circuit 1330 as compared to the multi-port DC output circuit 730 when the intermediate rail voltages $Vout_1$ and $Vout_2$ are far apart in voltage level. If all three ports $Port_{1-3}$ are used at the same time, $VBUS_3$ must be the same output voltage as either $VBUS_1$ or $VBUS_2$. If only two ports are in use, there are no restrictions on the voltage output thereof.

An example of operation of the power converter 100 configured to use the multi-port DC output circuit 230 when a primary side active clamp circuit is used is illustrated in the simplified plots 1400 shown in FIG. 14, in accordance with some embodiments. The simplified plots 1400 include plots of intermediate rail voltage $Vout_1$ 1402, intermediate rail voltage $Vout_2$ 1404, intermediate rail voltage $Vout_1$ switch $SV_1$ control signal Out1$G_1$ 1406, intermediate rail voltage $Vout_2$ switch $SV_2$ control signal Out1$G_2$ 1408 (which in this case is approximately the same as active clamp switch M3 control signal $PWM_{M3}$), a voltage $V_{dsM1}$ 1410 developed at the second terminal 110 of the main switch M1, a voltage 1412 developed across the active clamp capacitor $C_C$, magnetizing current $i_{u}$ 1414, a secondary side current 1416 that flows into the intermediate voltage rail for $Vout_2$ while the active clamp capacitor M3 is enabled, and a secondary side current 1418 that flows into the intermediate voltage rail for Vout before the active clamp switch M3 is enabled. Since peaks of the secondary side current are more trapezoidal in shape when the active clamp switch M3 is ON, more charge may be transferred to loads of the multi-port DC output circuit 230 without as high of a current spike, thereby reducing conduction losses.

In the example simulation shown, a lower level of power is provided to a first DC output port of the multi-port DC output circuit 230 for four initial switching cycles, and then a higher level of power is provided to a second DC output port of the multi-port DC output circuit 230 for the subsequent two switching cycles.

Reference has been made in detail to embodiments of the disclosed invention, one or more examples of which have been illustrated in the accompanying figures. Each example has been provided by way of an explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A power converter comprising, an AC/DC converter configured to generate a first secondary side output voltage based on an AC input voltage, the first secondary side output voltage being a first DC voltage;

a multi-port DC output circuit configured to receive the first secondary side output voltage from a first output node of the AC/DC converter and to provide respective DC output voltages to a first DC output port and a second DC output port, the multi-port DC output circuit comprising a first intermediate rail voltage switch, a second intermediate rail voltage switch, and a plurality of bus switches, a body diode of the first intermediate rail voltage switch being forward biased with respect to the first secondary side output voltage, and a body diode of the second intermediate rail voltage switch being reverse biased with respect to the first secondary side output voltage;

a first intermediate rail buffer capacitor;

a second intermediate rail buffer capacitor;

a first output buffer capacitor electrically connected to the first DC output port; and a second output buffer capacitor electrically connected to the second DC output port;

wherein:

a first node of the first intermediate rail voltage switch is electrically connected to the first output node of the AC/DC converter;

a first node of the second intermediate rail voltage switch is electrically connected to the first output node of the AC/DC converter;

a second node of the first intermediate rail voltage switch is electrically connected to the first intermediate rail buffer capacitor to generate a first intermediate rail voltage;

a second node of the second intermediate rail voltage switch is electrically connected to the second intermediate rail buffer capacitor to generate a second intermediate rail voltage; and the plurality of bus switches are configured to control a routing of the first intermediate rail voltage and the second intermediate rail voltage of the multi-port DC output circuit to the first DC output port and the second DC output port in response to a plurality of gate control signals.

2. The power converter of claim 1, wherein:

the plurality of bus switches are configured to control the routing of the first intermediate rail voltage and the second intermediate rail voltage of the multi-port DC output circuit to the first DC output port and the second DC output port based on respective desired output voltages of each of the first DC output port and the second DC output port.

3. The power converter of claim 1, wherein:

a gate control signal of the plurality of gate control signals is generated using a charge pump circuit to control the first intermediate rail voltage switch; and a voltage level of the gate control signal is configured to reduce an RDS(on) of the first intermediate rail voltage switch as compared to an RDS(on) of the first intermediate rail voltage switch when controlled by a lower voltage level of the gate control signal.

4. The power converter of claim 1, wherein:

respective RDS(on) values of the first intermediate rail voltage switch and the second intermediate rail voltage switch are lower than respective RDS(on) values of the plurality of bus switches.

5. The power converter of claim 1, further comprising:

a first bus voltage switch having a first node that is electrically connected to the first intermediate rail buffer capacitor, and a second node that is electrically connected to the first output buffer capacitor; and a second bus voltage switch having a first node that is electrically connected to the first intermediate rail buffer capacitor and a second node that is electrically connected to the second output buffer capacitor;

wherein:

a body diode of the first bus voltage switch is reverse biased with respect to the first intermediate rail voltage;

a body diode of the second bus voltage switch is reverse biased with respect to the first intermediate rail voltage; and the first bus voltage switch and the second bus voltage switch are operable to selectively route the first intermediate rail voltage to either or both of the first DC output port and the second DC output port in response to the plurality of gate control signals.

6. The power converter of claim 5, further comprising:

a first pair of bus voltage switches electrically in series and having a first node of the pair that is electrically connected to the second intermediate rail buffer capacitor and a second node of the pair that is electrically connected to the first output buffer capacitor; and a second pair of bus voltage switches electrically in series and having a first node of the pair that is electrically connected to the second intermediate rail buffer capacitor and a second node of the pair that is electrically connected to the second output buffer capacitor;

wherein:

respective body diodes of the first pair of bus voltage switches are reverse biased with respect to each other;

respective body diodes of the second pair of bus voltage switches are reverse biased with respect to each other; and the first pair of bus voltage switches and the second pair of bus voltage switches are operable to selectively route the second intermediate rail voltage to either or both of the first DC output port and the second DC output port in response to the plurality of gate control signals.

7. The power converter of claim 1, further comprising:

a first pair of bus voltage switches electrically in series and having a first node of the pair that is electrically connected to the second intermediate rail buffer capacitor and a second node of the pair that is electrically connected to the first output buffer capacitor; and a second pair of bus voltage switches electrically in series and having a first node of the pair that is electrically connected to the second intermediate rail buffer capacitor and a second node of the pair that is electrically connected to the second output buffer capacitor;

wherein:

respective body diodes of the first pair of bus voltage switches are reverse biased with respect to each other;

respective body diodes of the second pair of bus voltage switches are reverse biased with respect to each other; and the first pair of bus voltage switches and the second pair of bus voltage switches are operable to selectively route the second intermediate rail voltage to either or both of the first DC output port and the second DC output port in response to the plurality of gate control signals.

8. The power converter of claim 1, further comprising:

a third bus voltage switch having a first node that is electrically connected to the second intermediate rail buffer capacitor and a second node that is electrically connected to a third output buffer capacitor of a third DC output port;

wherein:

a body diode of the third bus voltage switch is reverse biased with respect to the second intermediate rail voltage; and the third bus voltage switch is operable to selectively route the second intermediate rail voltage to the third DC output port in response to the plurality of gate control signals.

9. The power converter of claim 8, further comprising:

a first pair of bus voltage switches in series having a first node of the pair that is electrically connected to the second intermediate rail buffer capacitor and a second node of the pair that is electrically connected to the first output buffer capacitor; and a second pair of bus voltage switches in series having a first node of the pair that is electrically connected to the second intermediate rail buffer capacitor and a second node of the pair that is electrically connected to the second output buffer capacitor;

wherein:

respective body diodes of the first pair of bus voltage switches are reverse biased with respect to each other;

respective body diodes of the second pair of bus voltage switches are reverse biased with respect to each other; and the first pair of bus voltage switches and the second pair of bus voltage switches are operable to selectively route the second intermediate rail voltage to either or both of the first DC output port and the second DC output port in response to the plurality of gate control signals.

10. The power converter of claim 1, further comprising:

a third intermediate rail voltage switch in electrical series with the first intermediate rail voltage switch, respective body diodes of the first intermediate rail voltage switch and the third intermediate rail voltage switch being reverse biased with respect to each other; and a fourth intermediate rail voltage switch in electrical series with the second intermediate rail voltage switch, respective body diodes of the second intermediate rail voltage switch and the fourth intermediate rail voltage switch being reverse biased with respect to each other.

11. The power converter of claim 10, wherein:

a first node of the third intermediate rail voltage switch is electrically connected to the first intermediate rail buffer capacitor to generate a first intermediate rail voltage; and a first node of the fourth intermediate rail voltage switch is electrically connected to the second intermediate rail buffer capacitor to generate a second intermediate rail voltage.

12. The power converter of claim 11, further comprising:

a first bus voltage switch having a first node that is electrically connected to the first intermediate rail buffer capacitor and a second node that is electrically connected to the first output buffer capacitor; and a second bus voltage switch having a first node that is electrically connected to the second intermediate rail buffer capacitor and a second node that is electrically connected to the second output buffer capacitor;

wherein:

a body diode of the first bus voltage switch is reverse biased with respect to the first intermediate rail voltage;

a body diode of the second bus voltage switch is reverse biased with respect to the second intermediate rail voltage; and the first bus voltage switch is operable to selectively route the first intermediate rail voltage to the first DC output port in response to the plurality of gate control signals; and the second bus voltage switch is operable to selectively route the second intermediate rail voltage to the second DC output port in response to the plurality of gate control signals.

13. The power converter of claim 10, wherein:

respective gate nodes of the first, second, third and fourth intermediate rail voltage switches are configured for independent control;

the third intermediate rail voltage switch and the fourth intermediate rail voltage switch are configured to remain enabled during a switching cycle of the power converter in response to respective gate control signals generated using one or more charge pump circuits.

14. The power converter of claim 10, further comprising:

a first bus voltage switch having a first node that is electrically connected to the first intermediate rail buffer capacitor and a second node that is electrically connected to the first output buffer capacitor; and a second bus voltage switch having a first node that is electrically connected to the second intermediate rail buffer capacitor and a second node that is electrically connected to the second output buffer capacitor;

wherein:

a body diode of the first bus voltage switch is reverse biased with respect to the first intermediate rail voltage;

a body diode of the second bus voltage switch is reverse biased with respect to the second intermediate rail voltage; and the first bus voltage switch is operable to selectively route the first intermediate rail voltage to the first DC output port in response to the plurality of gate control signals; and the second bus voltage switch is operable to selectively route the second intermediate rail voltage to the second DC output port in response to the plurality of gate control signals.

15. The power converter of claim 1, further comprising:

a transformer having a primary winding and a secondary winding, a first winding node of the primary winding being configured to be coupled to a voltage source to receive an input voltage, the secondary winding being configured to provide the first secondary side output voltage;

a main switch coupled to a second winding node of the primary winding to control a current through the primary winding;

an active clamp circuit electrically connected to the primary winding; and a synchronous rectifier switch electrically connected to the secondary winding.

16. The power converter of claim 15, wherein:

the plurality of bus switches are configured to control a routing of the first intermediate rail voltage and the second intermediate rail voltage of the multi-port DC output circuit to the first DC output port and the second DC output port based on a respective desired output voltage at each of the first DC output port and the second DC output port and in response to a portion of a switching cycle of the main switch.

17. A power converter comprising:

an AC/DC converter configured to generate a first secondary side output voltage based on an AC input voltage, the first secondary side output voltage being a first DC voltage; and a multi-port DC output circuit configured to receive the first secondary side output voltage from a first output node of the AC/DC converter and to provide respective DC output voltages to a first DC output port and a second DC output port, the multi-port DC output circuit comprising a first intermediate rail voltage switch, a second intermediate rail voltage switch, and a plurality of bus switches, a body diode of the first intermediate rail voltage switch being forward biased with respect to the first secondary side output voltage, and a body diode of the second intermediate rail voltage switch being reverse biased with respect to the first secondary side output voltage;

a first intermediate rail buffer capacitor;

a second intermediate rail buffer capacitor;

a first output buffer capacitor electrically connected to the first DC output port; and a second output buffer capacitor electrically connected to the second DC output port;

wherein:

a first node of the first intermediate rail voltage switch is electrically connected to the first output node of the AC/DC converter to receive the first secondary side output voltage;

a second node of the first intermediate rail voltage switch is electrically connected to the first intermediate rail buffer capacitor to generate a first intermediate rail voltage;

a first node of the second intermediate rail voltage switch is electrically connected to a second output node of the AC/DC converter to receive a second secondary side output voltage, the second secondary side output voltage being a second DC voltage;

a second node of the second intermediate rail voltage switch is electrically connected to a first node of a third intermediate rail voltage switch, a second node of the third intermediate rail voltage switch being electrically connected to the second intermediate rail buffer capacitor to generate a second intermediate rail voltage;

respective body diodes of the second intermediate rail voltage switch and the third intermediate rail voltage switch are reverse biased with respect to each other; and the plurality of bus switches are configured to control a routing of a first intermediate rail voltage and a second intermediate rail voltage of the multi-port DC output circuit to the first DC output port and the second DC output port in response to a plurality of gate control signals.

18. The power converter of claim 17, wherein:

respective gate nodes of the second intermediate rail voltage switch and the third intermediate rail voltage switch are configured for independent control;

the third intermediate rail voltage switch is configured to remain enabled during a switching cycle of the power converter in response to a gate control signal generated using a charge pump circuit.

* * * * *